US006904526B1

(12) United States Patent
Hongwei

(10) Patent No.: US 6,904,526 B1
(45) Date of Patent: Jun. 7, 2005

(54) SYSTEM AND METHOD OF AUTHENTICATING INDIVIDUALS

(76) Inventor: Yang Hongwei, Room 29, Sixth Building, 4 Xianghongqi, Xiangshan Street, Haidian District, Beijing 400094 (CN)

(*) Notice: Subject to any disclaimer, the term of this patent is extended or adjusted under 35 U.S.C. 154(b) by 912 days.

(21) Appl. No.: 09/711,303

(22) Filed: Nov. 14, 2000

(30) Foreign Application Priority Data

Apr. 28, 2000 (CN) .......................................... 00106192 A

(51) Int. Cl.[7] .............................. H04K 1/00; H04L 9/00
(52) U.S. Cl. ......................... 713/182; 713/172; 713/183
(58) Field of Search ................................ 713/182, 183, 713/172

(56) References Cited

U.S. PATENT DOCUMENTS

| 4,720,860 A | | 1/1988 | Weiss | |
|---|---|---|---|---|
| 4,885,778 A | | 12/1989 | Weiss | |
| 4,935,962 A | * | 6/1990 | Austin | 713/159 |
| 4,974,193 A | | 11/1990 | Beutelspacher et al. | |
| 5,535,276 A | * | 7/1996 | Ganesan | 713/155 |
| 5,737,523 A | * | 4/1998 | Callaghan et al. | 713/201 |
| 5,815,573 A | * | 9/1998 | Johnson et al. | 380/286 |
| 5,887,065 A | | 3/1999 | Audebert | |
| 5,937,068 A | * | 8/1999 | Audebert | 713/185 |
| 6,105,133 A | * | 8/2000 | Fielder et al. | 713/169 |
| 6,343,361 B1 | * | 1/2002 | Nendell et al. | 713/171 |
| 2001/0016915 A1 | * | 8/2001 | Sugano et al. | 713/201 |
| 2003/0105964 A1 | * | 6/2003 | Brainard et al. | 713/178 |

* cited by examiner

Primary Examiner—Ayaz Sheikh
Assistant Examiner—Ali Mashaal
(74) Attorney, Agent, or Firm—Birch, Stewart, Kolasch & Birch, LLP

(57) ABSTRACT

A method of dynamic password authentication used in an authentication system, in which a password generator applies a segmentation on its dynamic variable, according to predetermined segment length and positions, to produce a segment initial value and an offset for the dynamic variable. An encryption process applied on secret cryptographic key, segment initial value and offset results in the production of first dynamic cipher. Another encryption process applied on secret cryptographic key, dynamic variable etc results in the production of second dynamic cipher. Then first dynamic cipher and second dynamic cipher are combined to result in the production of a dynamic password. When a password undergoes verification executed by verifier, the verifier applies appropriate inverse processing. The present method can serve to enable the generator generated dynamic password to transmit synchronous information implicitly to verifier, which improves security in generation of a dynamic password and efficiency in password verification. Therefore reduction in costs of generator manufacture may be resulted.

24 Claims, 5 Drawing Sheets

SYSTEM AND METHOD OF AUTHENTICATING INDIVIDUALS

The present invention relates to an electronic authentication system and method by which passwords (or ciphers etc.) are used for identification and access control. Particularly, the present invention relates to electronically generated, dynamic, random and unpredictable passwords. By means of the verification of these passwords, authorized individuals and users can be correctly identified. Thus, discrimination on the grants or rejects of actions addressing access, entrance and exit, of protected system resources are enabled, whether conditional service can be provided, whether privileged business interactions etc. can be taken. The present invention more particularly relates to the access control and identity verification in a variety of communication networks, telecommunication networks, and computer networks.

Passwords are the type of means most commonly used in user identity legality verifications. Any authorized user can hold in possession his/her own identifier ID (user name, serial number or account number), which differs to IDs of other users in the system, and his/her secret password (PW or PIN) that are kept secret from other users. If the user wants to log in the system, he must enter his user ID and password at the request node. The system reserves the IDs and passwords of all the authorized users. At the authentication node, the received ID is used to extract the correct password of the user. That latter password is used for comparison with the received password. In case a match is obtained, a validity of the user ID is acknowledged and access to the system is enabled or service is provided. Otherwise, the identity is illegal and access is rejected or service is not provided. However there exists the risk in direct reservation of user passwords in the system. For the sake of safeguarding the security of password reservation, an approach or solution exists in the utilization of an one-way hash function in the calculation of hash values of user passwords and storing such values (such as UNIX). When a user password is received at an authentication node, the one-way hash function is used to calculate the hash value of the password and comparison is made with the correct hash value inside the system to, verify the legality of the password. Following the rapid development of communication networking, the chances of to-from traffics of passwords on the nets are increasing. The problem in failures in traditional password authentication systems to provide protective facilities for password transmissions on the networks has become more and more prominent. Cases of interception of passwords on the networks by hackers became more frequently encountered. For the object of safe transmission of passwords, the method of encrypting the passwords before their transmission on the net has come to no avail in providing a bit more security. Because hackers can intercept these enciphered passwords and use them directly just the same to disguising as authorized users, with no need for restoring the encrypted passwords into their plain forms. To the authentication node, only one deciphering procedure is added. Therefore, the verification of user's true or false is still impossible.

The thorough solution to this problem is embodied in the application of dynamic passwords that allow each password work only once in its life which is only limited to a very short duration. The password is made to vary with time in random unpredictable manners. Thus the password would be useless or ineffective even when intercepted by hackers. Dynamic passwords are generally generated through the use of a portable device in the size of credit cards or looks like conventional calculators. Here we call it a dynamic password generator, or a password generator, or simply a generator for abbreviation. Some time it is nicknamed "the card" or the "the token" in short.

U.S. Pat. No. 4,720,860 discloses a system for dynamic password authentication, which makes use of a static variable and a time dependent dynamic variable to serve as the input parameters of a secret cipher algorithm. Inside each one of the dynamic password generators owned by authorized users fixed codes are stored. At the same time on the surface of each generator, the fixed code is endorsed to prevent any lost in remembrance. The dynamic password generator automatically generates and displays an unpredictable dynamic password at constant time interval (such as one minute) separations. The dynamic password is generated through inputting fixed code as the static variable into a cipher algorithm and inputting the current time registered by a clock (which also includes the date, while time unit is in a minute) as the dynamic variable to enter into the algorithm. Whenever an authorized user requests an access, the person must deliver his or her fixed code and the dynamic password displayed by the generator at the moment to the authentication node. The authentication node through utilizing the same cipher algorithm as the generator, in conjunction with the fixed code and the time on the clock of the authentication node, which in principle should be consistent with the time used by the dynamic password generator, to generate also a dynamic password. Then the generated password is compared with the received password to see if a match is reached. However this kind of system does not exclude easy acquisition of the fixed code either through peeking onto the inscribed symbols on the surface of the password generator held by the authorized user, or through interception on communication lines. Therefore for the sake of safe guarding the security of the system, the cipher algorithm for calculating the password must be kept secret. Once the secrecy of the cipher algorithm is deciphered, the security of the whole system maybe endangered. This is also the reason why this patent requests the cipher algorithm be stored in a volatile memory. Thus, upon any attempt of decipherment of the generator is encountered, the cipher algorithm will be thoroughly deleted. In this patent, the dynamic variables of either the dynamic password generator held by the authorized user side or the authentication node side must all be generated independently. A consistency of the clocks on the independent sides must be kept for the generation of dynamic variables, or else normal request may be rejected. However, due to the fact that in reality, a certain amount of relative deviations between two different clocks is unavoidable. In U.S. Pat. No. 4,885,778, the continuation of U.S. Pat. No. 4,720,860, a method of maintaining synchronization of clocks and specific verification of users is disclosed. This patent requires the password generators to generate passwords at predefined time intervals (such as 1 minute, 2 minutes etc.). However, the authentication node side must use a duration time length much longer than the time interval defined by user password generator (such as 5 minutes, 10 minutes etc.), to establish an effective time range. When the authorized user requests, the authentication node may calculate a multiple of passwords (such as 5 or 10 passwords). If a match is obtained with one of those passwords, access is enabled. Burden of computations placed on the authentication node is evidently much higher. Especially in the cases where the time deviation between the clocks on generator side and the verification side are increased, the effective time length required must be correspondingly enlarged. The computation burden placed on the authentication side will also becomes much heavier. Consequently, comparatively better results given by this method can result only when the effective time length required can be effectively shortened. In this respect, more stringent requirements are placed on the precision of the clocks on both sides. An addition shortcoming of the above method is in the failure in comparatively quick excluding illegal passwords received. Besides, the amount of computation consumed on an illegal password by the system is much greater than the amount consumed on any legal password. Because, the former computation requires the computation of all the possible passwords be finished within the effective time duration, for the comparison of the illegal passwords one by one can be made before achieving the exclusion at the end. However, this may provide hackers convenience for offences in the form of service rejection.

The clock on the authentication node server may be more stable with comparatively high precision. But the situation on the password generator side is different. Reduction in cost of password generator production is the first thing to be considered in the design. Installation of expensive high quality zero-deviation clocks on password generators is impractical. On the other hand, the password generators are provided to the authorized users for portable use so they can be carried along with the users. Therefore the clock inside each generator is subjected to influences of many unpredictable factors, like the variation of temperature, stability of voltage etc. Therefore holding the clock at the authentication node and that at the password generator at a high degree of synchronization is an unrealizable matter, in actual fact. To maintain high consistency with clocks of mass produced password generators is even more unimaginable.

Attempts to install comparatively low cost clocks on password generators, to make them have a certain degree of synchronization with clocks at the authentication nodes, so as to ensure the generation of reliable passwords, has long been the direction of the efforts in this realm of technology. U.S. Pat. No. 5,887,065 and U.S. Pat. No. 5,937,068 disclose a system for user authentication with clock synchronization. Each of the above two patents uses two dynamic variables. One of them originates from a clock. The other originates from the number of authentication request sent in by the user. (This is actually the number of times dynamic passwords generated by password generator.) These two variables are combined before being encrypted by an encryption key that varies with the number of times of password generation. (Cipher algorithm can be known algorithms, such as DES, or kept secret.) The encrypted variables, in whole or in part, together with lowest effective bits (For example, 8 bits, of which 4 bits are the lowest 4 bits of the clock variable bits at that time. The other 4 its are the lowest 4 bits of the variable representing the number of times of password generation) in the two variables mentioned, are combined to form a dynamic password. When received at the authentication node, the synchronization information in the password is used to replace the lowest effective bits in corresponding variable value of the authentication node side (for example, the two lowest 4 bits of two variables respectively). The replaced variables are discriminated to see if they lie within a pre-determined effective range. If they do not lie within the effective range, add 1 to or subtract 1 from the higher bits that are not replaced (for example, the 5th bit of the replaced variable). Then another adjustment on the values of the variable is tried. In case the variable values failed to fall within the effective range after adjustment, an illegal password is judged. Thus access is rejected; Otherwise, just as long as their values stay within the effective range, the variables can be encrypted with the same cipher algorithm, and encrypted results are compared with the remaining parts in the user's password. If match is found, the password will be judged as legal. In this authentication system, a certain amount of plain synchronous information is included in the dynamic passwords. When a password has a length of n bits (say n=30). The transferred synchronous information has a length of m bits (say m=8). Then the actual length of password is only n-m bits (for instance n-m=22). Since the probability of conjecturing said password is $1/2^{n-m}=2^m \times 1/2^n$. That is to say, the probability of each time conjecturing the password is $2^m$ times (for instance 256 times) higher than the probability of the n bit password $1/2^n$. In practical use, passwords should be as short as possible. A long password may easily cause the user to get tired of it. It is unpractical and unrealistic. Therefore every bit in the password is precious and should be used to the full extent. When plain form is used in passwords to transmit synchronous information, the security of the password generation may be degraded. This form of information transmission provide d convenience to variable synchronization on the verification side. At the same time they provided important information to hackers. When generating passwords, this information serves as input parameters of cipher algorithm as well as parameters deciding variations of secret cryptographic keys. In addition, the cipher algorithm is open to the public. Therefore having known the synchronous information, the space of secret cryptographic keys to be searched can be much reduced. Furthermore, the variation of the secret cryptographic keys deciding the password generation, after each time the passwords are generated, may bring difficulties in management of users' secret cryptographic keys on the authentication node side. Because, safe and efficient management of a secret cryptographic key that constantly varies is much more difficult and complicated than that of a fixed secret cryptographic key.

The object of the present invention is to provide a system and method of authenticating dynamic passwords to remedy those shortcomings mentioned above. In particular, the object of the present invention is to make every dynamic password generated by every dynamic password generator able to transmit synchronous information implicitly to authentication nodes, both for providing authentication nodes with efficient synchronous information, and avoiding the degradation of security of dynamic password generation. At the same time, the present invention allows the authentication node side to use the recovered synchronous information mentioned to rapidly exclude the illegal passwords and to improve the efficiency of password verification, as well as allows the cost in production of password generators to be reduced. On the whole, the drive is aimed at the provision of a safe and efficient system and method of authenticating dynamic passwords.

To achieve the above object, the present invention provides a method of authenticating an individual from at least one individual in an authentication system, including at least one dynamic password generator and at least one verifier, the dynamic password generator holding therein a first secret cryptographic key and a first dynamic variable, the verifier holding therein a second secret cryptographic key of the dynamic password generator and a second dynamic variable, the first and second dynamic variables being produced independently in the dynamic password generator and the verifier; the method comprising steps of:

(a) in the event of generating a dynamic password, performing following steps by a microprocessor in the dynamic password generator:

(a1) segmenting the first dynamic variable, based on a predefined segment length and positions, identifying a first segment initial value and a first offset for the first dynamic variable;

(a2) carrying out a first encryption process on the first secret cryptographic key, the first segment initial value and the first offset to produce a first dynamic cipher; carrying out a second encryption process on the first secret cryptographic key and the first dynamic variable to produce a second dynamic cipher;

(a3) combining the first dynamic cipher and the second dynamic cipher to produce a dynamic password;

(b) transmitting the dynamic password to the verifier;

(c) in the event of verifying a password, performing following steps by a microprocessor in the verifier:

(c1) separating a received dynamic password into a third dynamic cipher and a fourth dynamic cipher; based on a predefined segment length and positions, segmenting the second dynamic variable to identify a second segment initial value and a second offset for the second dynamic variable; and calculating at least one estimated segment initial value and an estimated range of offsets based on the second segment initial value and the second offset;

(c2) carrying out a third encryption process on the third dynamic cipher, an estimated segment initial value and the second secret cryptographic key to produce a third offset;

(c3) if the third offset is within the estimated range of offsets, restituting a third dynamic variable with the third offset and the estimated segment initial value; carrying out a fourth encryption process on the second secret cryptographic key and the third dynamic variable to produce a verification code; comparing the verification code with the fourth dynamic cipher; if matching, enabling the user to access since the user is deemed legal and having the verification terminated; if mismatching, or the third offset is not within the estimated range of offsets, judging whether there is another estimated segment initial value; if there is no other estimated segment initial value, rejecting the user's access and having the verification terminated since the user is deemed illegal; and if there is another estimated segment initial value, fetching a next estimated segment initial value and going to step (c2).

In step (a2) of the above method, the second encryption process is carried out on the first secret cryptographic key, the first dynamic variable and the first segment initial value to produce the second dynamic cipher.

In step (c3) of the above method, the fourth encryption process is carried out on the second secret cryptographic key, the third dynamic variable and the estimated segment initial value to produce the verification code.

In step (a2) of the above method, the second encryption process is carried out on the first secret cryptographic key, the first dynamic variable, the first segment initial value and the first offset to produce the second dynamic cipher.

In step (c3) of the above method, the fourth encryption process is carried out on the second secret cryptographic key, the third dynamic variable, the estimated segment initial value and the third offset to produce the verification code.

In step (a2) of the above method, the first encryption process including a first encryption algorithm carried out on the first secret cryptographic key and the first segment initial value to produce a first dynamic cryptographic key, and a first dynamic transformation table generated with the first dynamic cryptographic key; wherein the first offset is translated into the first dynamic cipher by the first dynamic transformation table.

In step (c2) of the above method, the third encryption process including a third encryption algorithm carried out on the second secret cryptographic key and the estimated segment initial value to produce a third dynamic cryptographic key, and a second dynamic transformation table generated with the third dynamic cryptographic key; wherein the third dynamic cipher is translated into the third offset by the second dynamic transformation table.

In step (a2) of the above method, by which the first dynamic cipher is produced, the first dynamic cryptographic key is used to construct a first dynamic permutation table, and the first offset is replaced with the first dynamic cipher by this table.

In step (c2) of the above method, by which the third offset is produced, the third dynamic cryptographic key is used to construct a second dynamic per mutation table, and the third dynamic cipher is replaced with the third offset by this table.

In step (a2) of the above method, by which first dynamic cipher is produced, the first dynamic cryptographic key is used to construct a first random code-group, and a random code in the first random code-group is addressed by the first offset as the first dynamic cipher.

In step (c2) of the above method, by which third offset is produced, the third dynamic cryptographic key is used to construct a second random code-group, and the address of a random code in the second random code-group that matches the third dynamic cipher is the third offset.

In step (a2) of the above method, the second encryption process including a first encryption algorithm carried out on the first secret cryptographic key and the first segment initial value to produce a second dynamic cryptographic key, and a second encryption algorithm carried out on the second dynamic cryptographic key and the first dynamic variable to produce the second dynamic cipher.

In step (c3) of the above method, the fourth encryption process including a third encryption algorithm carried out on the second secret cryptographic key and the estimated segment initial value to produce a fourth dynamic cryptographic key, and a fourth encryption algorithm carried out on the fourth dynamic cryptographic key and the third dynamic variable to produce the verification code.

In step (a2) of the method, the second encryption process secret cryptographic key and the first segment initial value to produce a second dynamic cryptographic key, which is then combined with the first offset to produce a fifth dynamic cryptographic key, and a second encryption algorithm carried out on the fifth dynamic cryptographic key and the first dynamic variable to produce the second dynamic cipher.

In step (c3) of the above method, the fourth encryption process including a third encryption algorithm carried out on the second secret cryptographic key and the estimated segment initial value to produce a fourth dynamic cryptographic key, which is then combined with the third offset to produce a sixth dynamic cryptographic key, and a fourth encryption algorithm carried out on the sixth dynamic cryptographic key and the third dynamic variable to produce the verification code.

In the above method, the dynamic password generator is initiated to generate a first verifier code, and that the verifier side has a second verifier code. On the dynamic password generator, the first encryption process is carried out on the first verifier code, the first secret cryptographic key, the first segment initial value and the first offset to produce the first dynamic cipher, and the second encryption process is carried out on the first secret cryptographic key, the first dynamic variable and the first verifier code to produce the second dynamic cipher. On the verifier, the third encryption process is carried out on the second verifier code, the second secret cryptographic key, the estimated segment initial value and the third dynamic cipher to produce the third offset, and the fourth encryption process is carried out on the second verifier code, the second secret cryptographic key, and the third dynamic variable to produce the verification code.

The present invention also provides a method of authenticating an individual from at least one individual in an authentication system, including at least one dynamic password generator and at least one verifier, the dynamic password generator holding therein a first secret cryptographic key and a first dynamic variable, the verifier holding therein a second secret cryptographic key of the dynamic password generator and a second dynamic variable, the first and second dynamic variables being produced in concert but independently in the dynamic password generator and the verifier; the method comprising steps of:

(a) in the event of generating a dynamic password, performing following steps by a microprocessor in the dynamic password generator:

(a1) segmenting the first dynamic variable, based on a predefined segment length and positions, identifying a first segment initial value and a first offset for the first dynamic variable;

(a2) carrying out a first encryption algorithm on the first secret cryptographic key and the first segment initial value to output a first dynamic cryptographic key and a second dynamic cryptographic key; generating a first dynamic transformation table based on the first dynamic cryptographic key; translating the first offset into a first dynamic cipher by the first dynamic transformation table; combining the second dynamic cryptographic key and the first offset to generate a fifth dynamic cryptographic key; and carrying out a second encryption algorithm on the fifth dynamic cryptographic key and the first dynamic variable to produce a second dynamic cipher;

(a3) combining the first dynamic cipher and the second dynamic cipher to produce a dynamic password;

(b) transmitting the dynamic password to the verifier;

(c) in the event of verifying a password, performing following steps by a microprocessor in the verifier:

(c1) separating a received dynamic password into a third dynamic cipher and a fourth dynamic cipher; segmenting the second dynamic variable, based on a predefined segment length and positions, identifying a second segment initial value and a second offset for the second dynamic variable; and calculating at least one estimated segment initial value and an estimated range of offsets based on the second segment initial value and the second offset;

(c2) carrying out a third encryption algorithm on the second secret cryptographic key and an estimated segment initial value to output a third dynamic cryptographic key and a fourth dynamic cryptographic key; generating a second dynamic transformation table based on the third dynamic cryptographic key, and translating the third dynamic cipher into a third offset by the second dynamic transformation table;

(c3) if the third offset is within the estimated range of offsets, restituting a third dynamic variable with the third offset and the estimated segment initial value; combining the fourth dynamic cryptographic key and the third offset to generate a sixth dynamic cryptographic key; carrying out a fourth encryption algorithm on the sixth dynamic cryptographic key and the third dynamic variable to produce a verification code; comparing the verification code with the fourth dynamic cipher; if matching, enabling the user to access since the user is deemed legal and having the verification terminated; if mismatching, or the third offset is not within the estimated range of offsets, judging whether there is another estimated segment initial value; if there is no another estimated segment initial value, rejecting the user's access and having the verification terminated since the user is deemed illegal; and if there is another estimated segment initial value, fetching a next estimated segment initial value and going to step (c2).

In steps (a1) and (c1) of the above methods, the method adopted for predefining a segment length and positions of the first and second dynamic variable uses the segment length to define the number of dynamic variables in a segment and the maximum offset, and uses the positions to define the starting point of a segment and segment initial values.

In the above methods, the first and second dynamic variables are defined respectively by the clocks of the dynamic password generator and the verifier, or defined by the number of times of passwords generated by the dynamic password generator.

In the above methods, if the first and second dynamic variables are defined by time, selecting the segment length greater enough than the maximum possible difference between the clocks of the dynamic password generator and the verifier during the effective time period of the dynamic password generator.

If the first and second dynamic variables are defined by the number of times of passwords generated by the dynamic password generator, selecting the segment length greater enough than the number of times of unverified passwords continuously generated by the dynamic password generator, which does not exceed the number permitted by the authentication system.

In the above method, if the first and second dynamic variables are defined by time, the first and second dynamic variables should be time values or their function values of a predefined time unit having a fundamental duration interval.

If the first and second dynamic variables are defined by the number of times of passwords generated by the dynamic password generator, the first and second dynamic variables should be the values or their function values of the number of times of passwords generated by the dynamic password generator.

In the above methods, before carrying out of the first encryption process or the first encryption algorithm on the first segment initial value, a first coding is given to the first segment initial value, and before carrying out of the second encryption process or the second encryption algorithm on the first dynamic variable, a second coding is given to the first dynamic variable, and the ways of the first coding and the second coding are different.

Before carrying out of the third encryption process or the third encryption algorithm on the estimated segment initial value, a third coding is given to the estimated segment initial value, and before carrying out of the fourth encryption process or the fourth encryption algorithm on the third dynamic variable, a fourth coding is given to the third dynamic variable, and the ways of the third coding and the fourth coding are different.

The first and second dynamic transformation tables generated by the first and third dynamic cryptographic keys is greater than the segment length.

In the above methods, if the segment length is no greater than 240, taking the length of the first and third dynamic ciphers as 8 bits.

The selection of the segment length should enable the starting point of a segment defined daily to remain consistent, and the selection of the starting point of a segment should keep away from the position of comparatively frequent user utilization period of the dynamic password generator.

According to predefined the segment length and the positions, the first dynamic variable is equal to the product of the first segment initial value and a specific value, plus the first offset; and the second dynamic variable is equal to the product of the second segment initial value and a specific value, plus the second offset.

In step (c3) of the above methods, if a match between the verification code and the fourth dynamic cipher is found, comparing the third dynamic variable with the third dynamic variable of last successful access, if the former quantity is found to be greater than the latter quantity, the user is judged as legal, access is thus enabled, and using the third dynamic variable to substitute the third dynamic variable of last successful access, storing in a database, and then verification procedure is terminated; in cases where the former quantity is not greater than the latter quantity, the user is judged as illegal and access is rejected, and then verification procedure is terminated.

In the above methods, the method of estimating segment initial values and the range of offsets is based on the second segment initial value and the second offset, selecting the second segment initial value and adjacent segment initial values in front of or behind the second segment initial value as the estimated segment initial values, selecting the second offset and adjacent offsets in front of and behind the second offset as the range of offsets; and the number of selected estimated segment initial values can not be greater than two, and the number of offsets within the range of offsets can be greater than one.

In the above methods, if the first and second dynamic variables are defined by time, the method of estimating segment initial values and the range of offsets is based on the second segment initial value R and the second offset r, defining an enabled error range [c1, c2] by the difference between last third dynamic variable and the second dynamic variable, defining an deviation value diff by the difference between last third dynamic variable and last second dynamic variable, defining a small value b1=r+diff+c1, and a large value b2=r+diff+c2; marking the maximum offset as max;

when b2<0, the estimated segment initial value is the values R1 adjacent and in front of R, and the estimated range of offsets is [b1+max, b2+max];

when b1<0<b2, one of the estimated segment initial values is the value R1 adjacent and in front of R, and the estimated range of offsets is [b1+max, max]; another estimated segment initial value is the value R, and the estimated range of offsets is [0, b2];

when b1>max, the estimated segment initial value is the value R2 adjacent and behind R, and the estimated range of offsets is [b1−max, b2−max];

when b1<max<b2, one of the estimated segment initial values is the value R2 adjacent and behind R, and the estimated range of offsets is [0, b2−max]; another estimated segment initial value is the value R, and the estimated range of offsets is [b1, max];

when neither of b1 or b2 are smaller than 0 and both are not greater than max, the estimated segment initial value is the value R, and the estimated range of offsets is [b1, b2];

if the first and second dynamic variables are defined by the number of times of passwords generated by the password generator, the method of estimating segment initial values and the range of offsets is based on accordance with the second segment initial value R and the second offset r, defining the number of times d by the authentication system, defining a small value b1=r, and a large value b2=r+d; marking the maximum offset as max;

when b2>max, one of the estimated segment initial value is the value R2 adjacent and behind R, and the estimated range of offsets is [0, b2−max]; another estimated segment initial value is the value R, and the estimated range of offsets is [b1, max];

when b2 is not greater than max, the estimated segment initial value is the value R, and the estimated range of offsets is [b1, b2].

In the above methods, if the first and second dynamic variables are defined by time, the method of estimating segment initial values and the range of offsets is based on accordance with the second segment initial value R and the second offset r, defining an enabled error range [c1, c2] by the difference between last third dynamic variable and the second dynamic variable, defining a deviation value diff by the difference between last third dynamic variable and last second dynamic variable, computing an average deviation diff/d1 in accordance with the number of time intervals d1 counted from first successful verification to last successful verification, estimating a deviation σ=(diff/d1)×d2 in accordance with the number of time intervals d2 counted from last successful verification to present verification, and defining a small value b1=r+diff+σ+c1 and a large value b2=r+diff+σ+c2; marking the maximum offset as max;

when b2<0, the estimated segment initial value is the values R1 adjacent and in front of R, and the estimated range of offsets is [b1+max, b2+max];

when b1<0<b2, one of the estimated segment initial values is the value R1 adjacent and in front of R, and the estimated range of offsets is [b1+max, max]; another estimated segment initial value is the value R, and the estimated range of offsets is [0, b2];

when b1>max, the estimated segment initial value is the value R2 adjacent and behind R, and the estimated range of offsets is [b1−max, b2−max];

when b1<max<b2, one of the estimated segment initial values is the value R2 adjacent and behind R, and the estimated range of offsets is [0, b2−max]; another estimated segment initial value is the value R, and the estimated range of offsets is [b1, max];

when neither of b1 or b2 are smaller than 0 and both are not greater than max, the estimated segment initial value is the value R, and the estimated range of offsets is [b1, b2].

The present invention also provides a system of authenticating an individual from at least one individual in a computer network which includes at least one dynamic password generator and at least one verifier, said dynamic password generator holding therein a first secret cryptographic key and a first dynamic variable, said verifier holding therein a second secret cryptographic key of said dynamic password generator and a second dynamic variable, said first and second dynamic variables being produced independently in said dynamic password generator and said verifier; characterized in that said dynamic password generator comprises:

means for segmenting said first dynamic variable, based on a predefined segment length and positions, and identifying a first segment initial value and a first offset for said first dynamic variable;

means for carrying out a first encryption process on said first secret cryptographic key, said first segment initial value and said first offset to produce a first dynamic cipher;

means for carrying out a second encryption process on said first secret cryptographic key and said first dynamic variable to produce a second dynamic cipher;

means for combining said first dynamic cipher and said second dynamic cipher to produce a dynamic password;

and that said verifier comprises:

means for separating a received dynamic password into a third dynamic cipher and a fourth dynamic cipher;

means for segmenting said second dynamic variable to identify a second segment initial value and a second offset for said second dynamic variable based on a predefined segment length and positions;

means for calculating at least one estimated segment initial value and an estimated range of offsets based on said second segment initial value and said second offset;

means for carrying out a third encryption process on said third dynamic cipher, an estimated segment initial value and said second secret cryptographic key to produce a third offset;

means for restituting a third dynamic variable with said third offset and said estimated segment initial value if said third offset is within the estimated range of offsets;

means for carrying out a fourth encryption process on said second secret cryptographic key and said third dynamic variable to produce a verification code;

means for comparing said verification code with said fourth dynamic cipher;

means for enabling the user to access if matching;

means for judging whether there is another estimated segment initial value, if mismatching, or said third offset is not within the estimated range of offsets;

means for rejecting the user's access and having the verification terminated if there is no other estimated segment initial value;

means for fetching a next estimated segment initial value and giving control to said means for restituting a third dynamic variable if there is another estimated segment initial value.

Advantages of the present invention are as follows:

1. Due to the fact that the present invention introduces the policy of segmentation in the processing of the dynamic variables, requirement for constant upkeep of stringent consistency between the dynamic variables generated by both sides can be avoided. Only relative synchronization of the segment initial values defined by the dynamic variables of the two engaging sides are required. Thus the correct verification of a dynamic password can be reached through keeping deviations between the dynamic variables from the dynamic password generator side and the verifier side respectively smaller than the maximum offset. This scheme suggested in the invention effectively solves the synchronization problem between the dynamic variables of password generator side and verifier side. In fact the scheme suggested in the invention provides convenience to password authentication and conditions for cost reduction in password generator implementation. Usually, estimation on one segment initial value would be sufficient on the verifier side. Only in cases where the offsets defined by the dynamic variables approached the minimum offset or the maximum offset, would two estimations on segment initial values be required. On the other side, through utilizing the values restituted from the dynamic ciphers in received dynamic passwords, most illegal passwords can be excluded. Thus time saving in excluding illegal password access and high efficiency of password verifications can be achieved.

2. The present invention utilizes the segment initial value of dynamic variable under the function of secret cryptographic key and the first encryption algorithm, to generate two random unpredictable dynamic cryptographic keys. Among the two keys, the first random unpredictable dynamic cryptographic key defines a first random unpredictable dynamic transformation table. By means of this table, the offset is replaced with the first random unpredictable dynamic cipher. The use of the table can help to achieve the object of implicit transfers of synchronized information to the verifiers. Thus, security and efficiency of every bit in dynamic passwords used by the users are guaranteed, and all the disadvantages encountered in transfers of surplus plain synchronous information can be eliminated. On the other hand, the second random unpredictable dynamic cryptographic key and the dynamic variable generate a second random unpredictable dynamic cipher through the action of the second encryption algorithm. Alternatively, the second dynamic cryptographic key and the offset are combined to generate another random unpredictable dynamic cryptographic key. Then this cryptographic key and the dynamic variable are used to generate a second random unpredictable dynamic cipher through the action of the second encryption algorithm. In this manner, the implementation of deciding the generation of the second dynamic cipher by a continuously varying cryptographic key is realized. Also the verifier side can be freed from the management of a continuously varying cryptographic key and just manages an unvarying cryptographic key that defines the dynamic cryptographic key.

A detailed description of the invention will be given in conjunction with the drawings, in which FIG. 1 is a schematic diagram of a password authentication system;

FIG. 2 shows the front view of the two dynamic password generators of the present invention;

FIG. 3 gives an example illustrating the segmentation of the dynamic variables adopted in the present invention;

Figure 6:
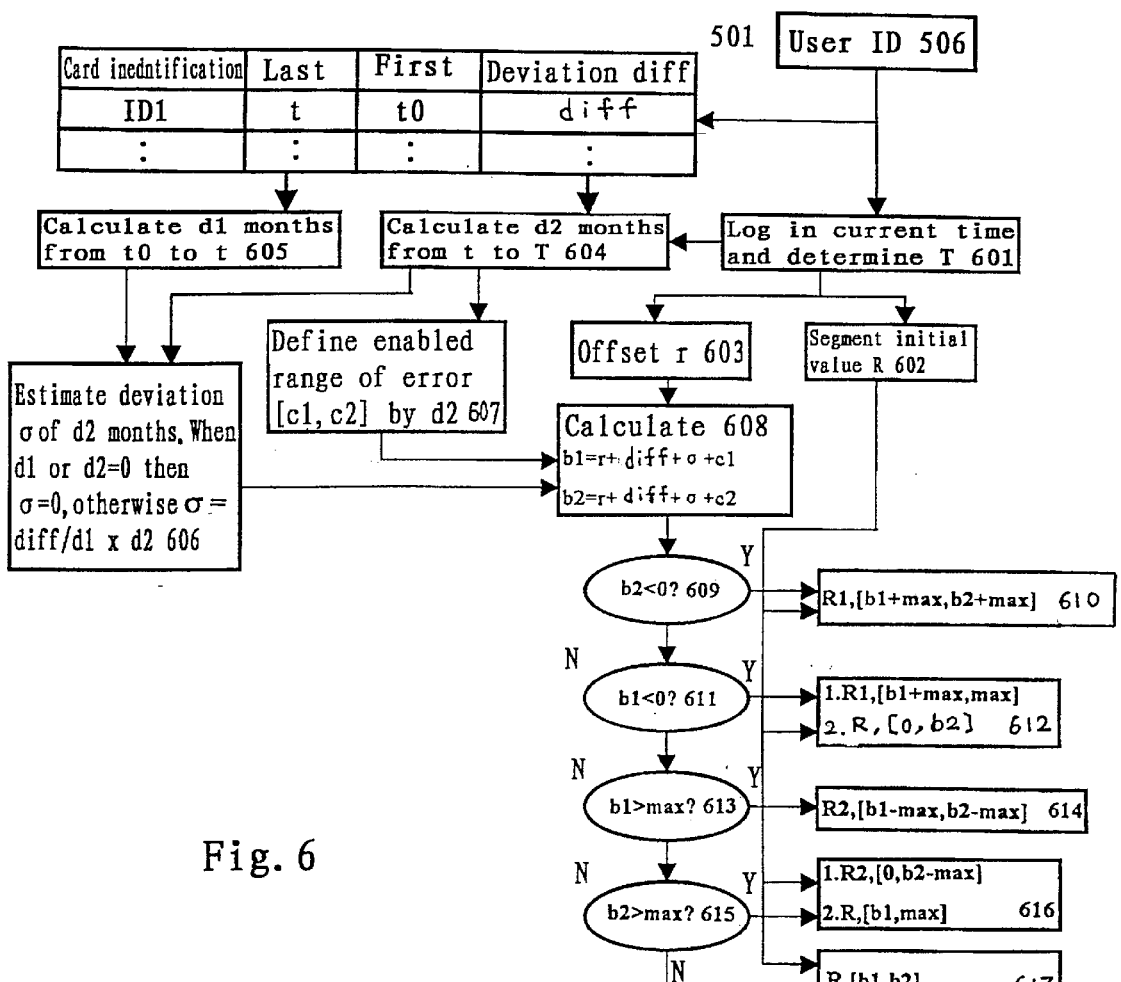
Figure 7:
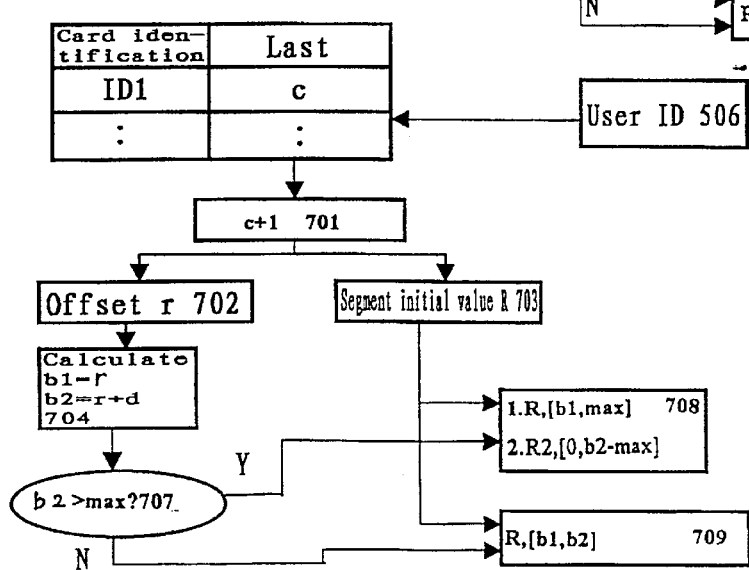
Figure 8:
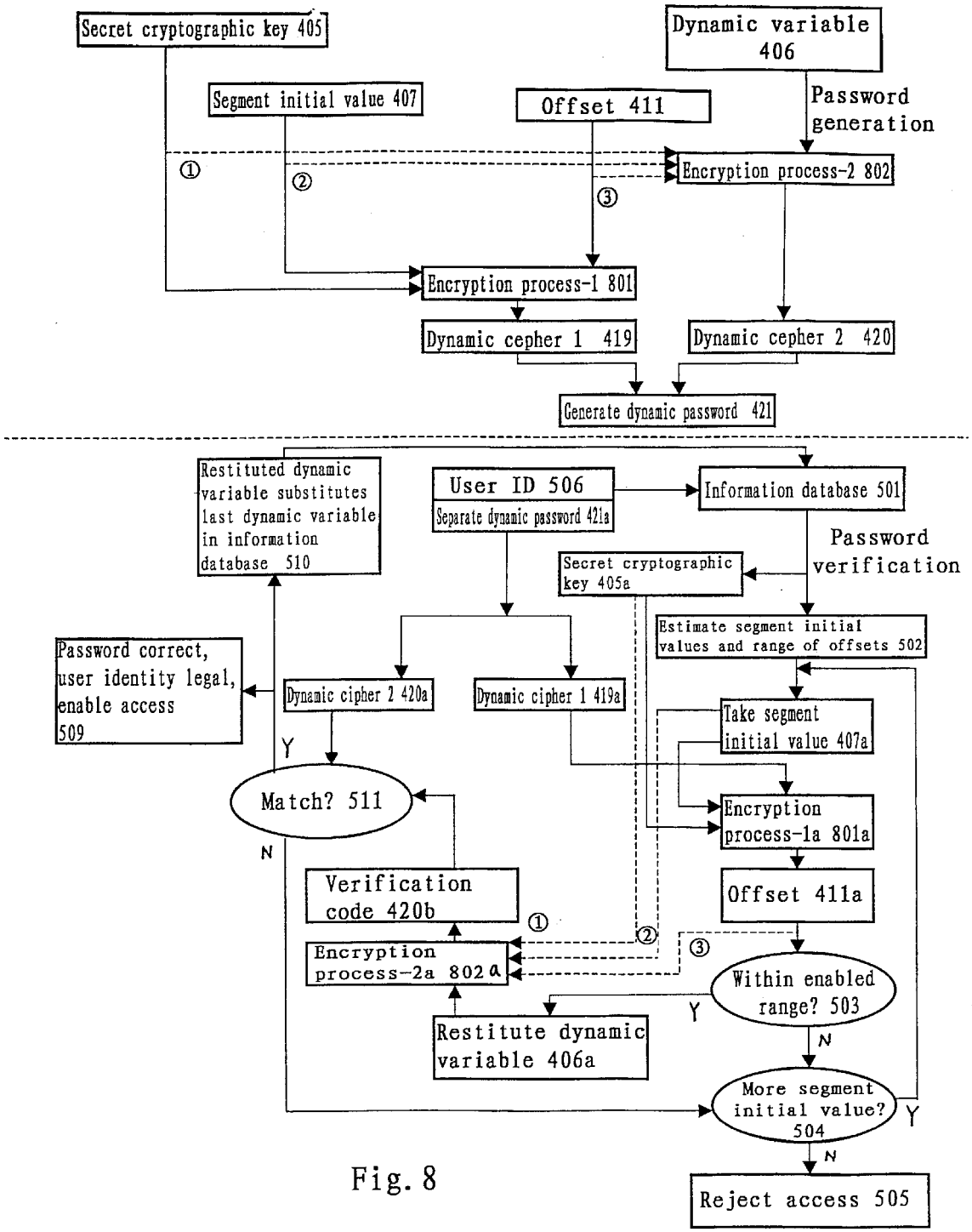

FIG. 6 gives a flowchart showing a verifier's estimation process for the segment initial values and the range of offsets when a dynamic variable is defined by time;

FIG. 7 gives a flowchart showing a verifier's estimation process for the segment initial values and the range of offsets when a dynamic variable is defined by number of times of password generation executed by a password generator;

FIG. 8 gives two diagrams showing the process flow when a dynamic password generator of the present invention generates a dynamic password and a verifier receives a dynamic password.

The system of the invention includes at least one (usually many) password generators held by authorized users and at least one (usually more than one) verifiers that can receive passwords from authorized users and thereby determine the legality of the users.

The password generator of the invention at least includes one general microprocessor that can execute the dynamic password generation program of the invention, and one memory that can store the program and the password generator cryptographic key. If necessary, it also has its own power supply to supply the energy for running the program. For a password generator that generates time-correlated passwords, a clock that can provide time information is also needed. The password generator is usually easy to carry and small in size, whose shape and size are like a credit card or a calculator.

Figure 2:
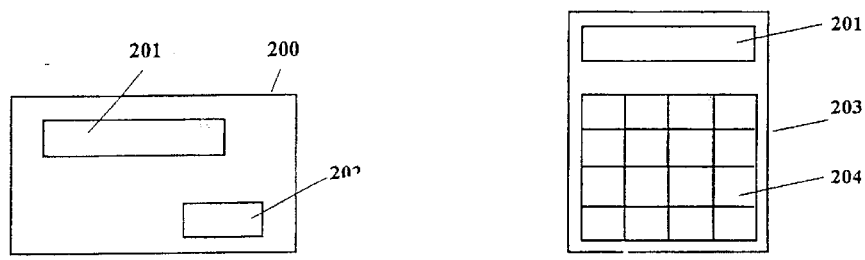

FIG. 2 shows the front views of two password generators 200 and 203. They all have display panels 201 to display the generated password or other correlated information. Naturally, display panels 201 can also be replaced with audio devices. Those output of devices resort to sound instead of visual display. 200 denotes a password generator with only a switch triggered key 202. This is mainly used under the circumstances of supporting only one verifier or generating a time-correlated password and not requiring PIN protection of the password generator. The operation of this type of generator is very convenient. With one touch of the trigger key 202, the password generator, according to the duration-time interval possessed by the predefined time unit, generates continuously the dynamic password and displays it on the panel 201. Then the displayed password is transferred to the verifier side. With once more touch of the trigger key 202, the password generation and the display are terminated. Thus, the process is repeated in cycles. Another type of password generator, 203 in FIG. 2, has multiple keys 204, such as numeric keys or function keys and so on. This is mainly used under the circumstances of supporting simultaneously multiple independent verifiers or requiring PIN protection of the password generator so as to prevent the password generator from being dropped-out and indiscriminately used by non-authorized personnel. This type of generator has even better protection measures. Before the password generation, an authorized user must input his/her own PIN. Only when the input PIN is identical to the PIN stored in the password generator can the password generator activate the password-generating program. With regard to the generation of the dynamic password generator that is not related to time, it can also be implemented by an ordinary smart card. By means of utilizing the card reader terminals or keys and panel on the connected computer, the power supply, keys and panel can be omitted. This type of generator can greatly reduce the cost of generator manufacturing. It can be extensively used in an environment having card reader terminals.

Figure 1:
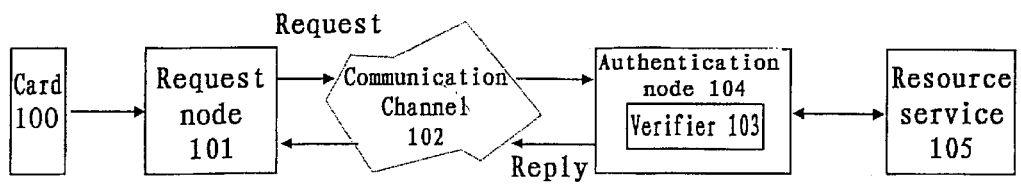

FIG. 1 is a general schematic diagram of the dynamic password authentication system of the present invention. 100 in the diagram is the password generator (also nicknamed "card") held by the authorized user only. The request node 101 is a tool for the authorized user to transfer his/her own user ID and password to the user verifier 103. The request node 101 can either be a computer, a client machine, a telephone, or a mobile phone. The request node can also be combined with the password generator. For instance, the password generator can be made into a firmware that is embedded in a computer or various communication devices, or a dynamic password generator in software form. The communication channel 102 can be composed of a communication mode of any known type. The verifier 103 comprises a processor capable of implementing the password verification program of the present invention method and a memory capable of storing that program and the related information of the authorized user. The verifier 103 is comprised in the authentication node 104. The authentication node 104 can be either a mainframe, a server, or a dedicated computer used as an access control server. The password verification program of verifier 103 can be used as a server program resident in authentication node 104, for instance as a daemon and to use the CPU and the clock resource of the authentication node 104. Therefore the authentication node can be taken as equal to the verifier. When verifier 103 receives the user ID and the dynamic password transferred from request node 101, the password verification program verifies the dynamic password and determines the correctness of the user password. If the password is correct, it is deemed that the user is the authorized legal user. The system enables the user to access the resources or to acquire conditional service 105, etc. If the password is incorrect, it is deemed that the user is illegal and the user's accesses is rejected.

Figure 3:
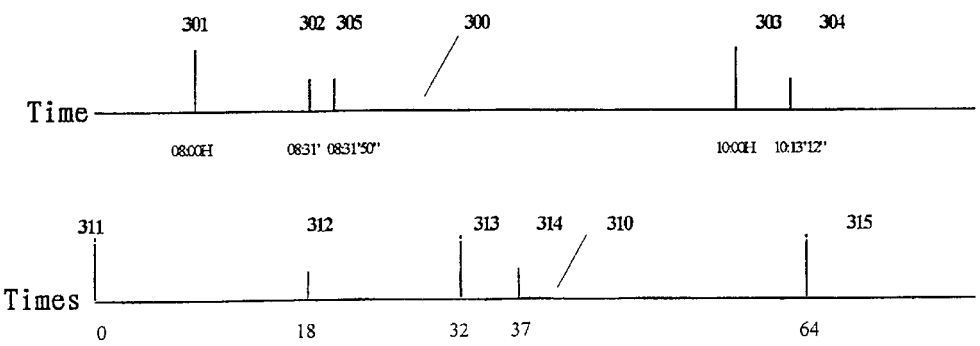

Prior to the explanation of FIG. 3, the following descriptions are given to the determination and segmentation of dynamic variables.

The dynamic password generator can generate dynamic passwords because the dynamic variable in the password generator can vary continuously. The passwords generated by the verifier can be consistent with the passwords generated by the password generator because the verifier side can determine the dynamic variable of the password generated by password generator side. One situation of the dynamic variable of the present invention is defined by the date and time generated by the clock (hereafter referred to as "time defined"). It generates a time correlative password. Another situation of the dynamic variable is defined by the times the password generator generates the passwords. It generates a password irrelevant to time.

If the dynamic variable is defined by time, the dynamic variable should be a time value of a predetermined precision (i.e., time unit) or a function of it. For instance, the dynamic variable can be the value of the product or sum of the time value and a specific number. The predetermined precision or time unit has a basic duration of time interval, which determines how frequent the password varies. In the case when the time units are 15 seconds, 30 seconds, or 1 minute etc, the password generated by the dynamic password generator would vary every 15 sec., 30 sec., 1 min., etc. For instance, if the password is generated at 0 second or 59 seconds after 9 o'clock 35 min., Jan. 30, 2000, and the time unit is 1 minute, 0 second is taken as the starting time of the basic duration of the time interval. That is, in any moment within the time period between 0 second to 59 seconds post 9 o'clock 35 minutes, the dynamic variable will take the value of 9 o'clock 35 minutes, Jan. 31, 2000. Of course, other certain sec. can also be taken as the initial point of the basic duration of time interval. In this case, it is unnecessary to go into details. When the time unit is 30 sec., the dynamic variable at the 0 sec. takes the value of 09:35, Jan. 31, 2000. But the dynamic variable at the 59 sec. takes the value of 09:35:30, Jan. 31, 2000.

If the dynamic variable is defined by the number of times the password generator generates the passwords, the dynamic variable takes the value of the number of times or its function. For instance, the dynamic variable can be the value of the product or sum of the value of the number of times with a specific number. After the password generator generates once a password, the dynamic variable is automatically increased by one. For instance, if the password generator has generated 1000 passwords, the dynamic variable for generating passwords at this moment is 1000. The dynamic variable for generating next password is changed to 1001.

The present invention implements the tactics of segmentation for the dynamic variable, effectively solving the problem of the synchronization between the dynamic variable of password generator and dynamic variable of verifier side. A segment length L and a position selection are predetermined. The segment length L specifies the number of dynamic variables contained in one segment. That is, the minimum offset value is 0 while the maximum offset value is L−1. The positions specify the initial point of a segment, namely to define the selection of the segment initial values. Therefore, arbitrary number of dynamic variables can uniquely define a segment initial value and an offset. Conversely, a segment initial value and an offset also uniquely define a dynamic variable. Actually, arbitrary dynamic variable can be taken as a combination of its defined segment initial value and its defined offset, for instance their sum. Or more generally, the dynamic variable is expressed as the product of its defined segment initial value and a certain specific value plus its defined offset. For instance, this specific value can be a predetermined integer. The definition of the segment length L and positions can be unified in an authentication system. That is, the selection of the L and the positions for all password generators in the system is the same. The selection of the L and positions can also be set individually for each password generator. Their selection can even be taken as an adjustable parameter for the password generators, which can be adjusted according to the state of usage. Of course, the verifier side must be informed of this adjustment and also make relevant change.

In the event that the dynamic variables are time defined, the segment length L should be so selected that it can be greater enough than the maximum possible deviation between the clock of a password generator and the clock of the verifier, within the effective period of the password generator. Or else, let L be selected greater enough than all the maximum possible deviations between the clocks of all password generators and clocks of all verifiers in the system. For instance, if the maximum possible deviation between the clock of a password generator and the clock of a verifier is estimated to be 60 min., when the selected time unit is 1 min., L should be at least 60. When the selected time unit is 30 sec., L should be at least 120. When the maximum possible deviation between the clocks of all password generators and the clocks of all verifiers in the whole system is two hours, the L uniquely defined for the system should be at least 120 (when the time unit is 1 min.) or at least 240 (when the time unit is 30 sec.). For the selection of segment positions, it would be best to avoid the time when the users use the password generators frequently. If the users use frequently at about 9 o'clock, and when L=120 (the time unit is 1 min.), the selected positions can be 8, 10,12,14,16,18,20, 22, 0, 2,4,6 o'clock sharp every day. This may cause that, in the high frequency period, the verifier can estimate only one segment initial value (only when the offset is too large or too small can two segment initial values need to be estimated).

Thus the passwords of the users are verified effectively. Besides, to facilitate the definition of segment initial value and the offset, the selection of segment length L had better make the defined segment positions keep consistent each day. For instance, if the selected positions are 8,10, 12,14, 16,18,20,22, 0,2,4, 6 o'clock sharp, this can be circulated every day. Suppose the effective use period of a password generator is four years. A specific example of L and position selection is given as follows:

| Basic Time Unit | L | Average Deviation Each Month | Positions Selection |
|---|---|---|---|
| 15 sec. | 120 | <37.5 sec. | 0.5, 1, 1.5, . . . , 23.5, 0 o'clock sharp of each day |
| 15 sec. | 240 | <75 sec. | 0, 1, 2, . . . , 22, 23 o'clock sharp of each day |
| 30 sec. | 120 | <75 sec. | 0, 1, 2, . . . , 22, 23 o'clock sharp of each day |
| 1 min. | 60 | <75 sec. | 0, 1, 2, . . . , 22, 23 o'clock sharp of each day |
| 1 min. | 120 | <150 sec. | 0, 2, 4, . . . , 20, 22 o'clock sharp of each day |
| 1 min. | 180 | <225 sec. | 0, 3, 6, . . . , 18, 21 o'clock sharp of each day |
| 1 min. | 240 | <300 sec. | 0, 4, 8, . . . , 16, 20 o'clock sharp of each day |

The basic time unit is the aforesaid time unit that determines the dynamic variable, and is also the duration of a dynamic password. If the duration expires, the password will be changed. The estimated average deviation of each month between the clock of the password generator and the clock used by the verifier should be smaller enough than the above value. The smaller the deviation between the clock of the password generator and the clock used by the verifier is, the shorter the basic time unit can be. The shorter the duration of a dynamic password is, the higher the security the system provides. It can be seen from the above that usually limiting the value of L to less than 240 can meet the requirement of the majority of actual applications.

If the dynamic variable is determined by the times that the passwords are generated, the segment length L should be greater enough than the times that the system allows the passwords generated by the password generator continuously not to be verified by the verifier. For instance, set L=32, then when the user uses the password generator to generate passwords, it is not allowed to generate continuously 32 passwords that are not successfully used. That is to say, one of these continuous passwords must pass the verification at the verifier side. Otherwise the synchronization will be lost. Owing to the sensitivity of this type of dynamic variable to user's usage of password generator, it would be best to use a PIN protected password generator, namely password generator 203 with multiple keys 204, as shown in FIG. 2. This prevents effectively the happening of the above situation.

FIG. 3 gives an example illustrating the segmentation of the dynamic variables adopted in the present invention;

Numeral 300 in FIG. 3 is an example of the segmentation of time-determined dynamic variable. Assume the time unit of the dynamic variable is 1 min., and L=120. That is, there are 120 dynamic variables in each segment. The selected positions are 0, 2, 4, 6, 8, 10, 12,14,16,18, 20, 22 o'clock sharp of each day. Numeral 302 denotes 8 o'clock 31 min. (The date is omitted for convenience of description. Same in later examples.) Numeral 305 denotes 8 o'clock 31 min. 50 sec. Then their segment initial values are 8 o'clock sharp, and their offsets are 31 all. Numeral 304 denotes 10 o'clock 13 min. 12 sec. Its segment initial value is 10 o'clock sharp, and its offset is 13. If the time unit of the dynamic variable is 30 sec., and L=240, the selected positions are still 0, 2, 4, 6, 8, 10, 12,14,16,18, 20, 22 o'clock sharp of each day. The segment initial value of 302 is 8 o'clock sharp, and its offset is 62. The segment initial value of 305 is 8 o'clock sharp, and its offset is 63. The segment initial value of 304 is 10 o'clock sharp, and its offset is 26.

Numeral 310 in FIG. 3 is an example of the segmentation of times-determined dynamic variable. Here L=32. The selected positions are 0, 32, 64, 96, . . . , etc. Numeral 312 denotes 18. Its segment initial value is 0, and its offset is 18. Numeral 314 denotes 37. Its segment initial value is 32, and its offset is 5. Numeral 315 denotes 64. Its segment initial value is 64, and its offset is 0.

Figure 4:
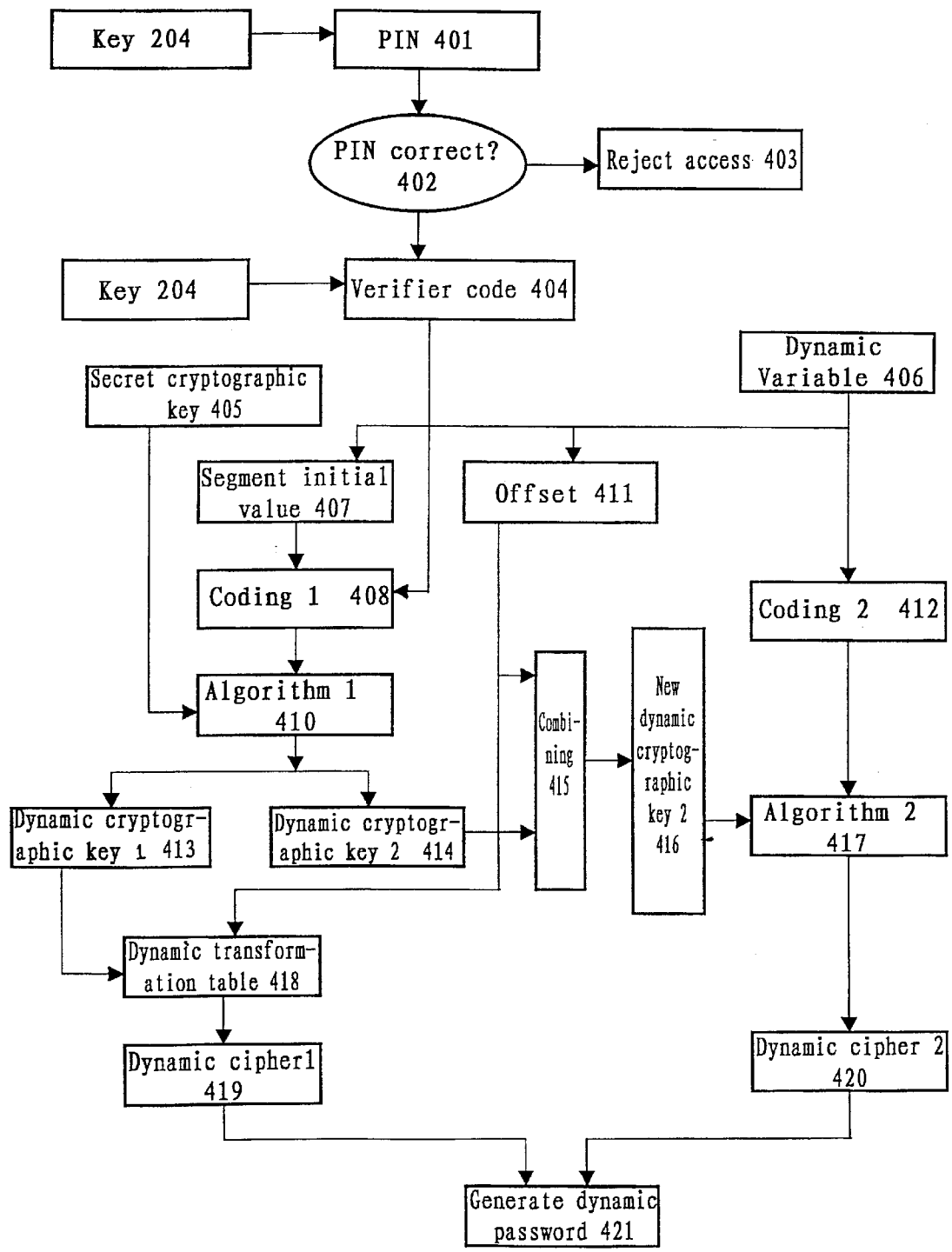
FIG. 4 is a diagram showing the principle of the operations of a dynamic password generator of the present invention when generating a dynamic password.

FIG. 4 is a showing the principle of the operations of a dynamic password generator of the present invention for generating the dynamic password when the user activates the dynamic password generator, such as to press keys 202 or 204 in FIG. 2.

For the password generator 203 of FIG. 2 that is PIN-protected or supports multiple verifiers, the authorized user inputs through key 204 the PIN 401 known alone by himself. At step 402, the password generator discriminates whether the PIN is correct or not. For instance, the PIN 401 is compared with a correct PIN saved in the generator so that the correctness of the PIN 401 is discriminated. If not correct, at step 403, further execution is rejected and the generator is turned off. If correct, in case of supporting multiple verifiers, it still requires to input verifier code 404 through key 204, requesting access. Thus, the program of generating password is activated. For the password generator 200 in FIG. 2, to activate the password generation program, it is only required to press key 202 once.

The password generator first determines dynamic variable 406 at this moment. If dynamic variable 406 is determined by time, time is fetched from the clock in the generator. If dynamic variable 406 is determined by the times of generating passwords, dynamic variable 406 is fetched from the memory which stores this parameter in the generator. The segment initial value 407 and offset 411 of the dynamic variable 406 are defined on the basis of the predetermined L and positions. Different presentation formats of segment initial value 407 and dynamic variable 406 can be used for the input values of coding step 408 and coding step 412. It can also be considered that different presentation formats of segment initial value 407 and dynamic variable 406 are used for the beginning of coding step 408 and coding step 412. Take the following case for example. At step 412, a time-determined dynamic variable 406 can be determined by the number of time units(for instance, an integer value 511 when the time unit is 1 min, and an integer value 1022 when the time unit is 30 seconds.) within a time period starting from a specific time point (for instance, 0 o'clock, Jan. 1, 2000) to the present moment (for instance, 8 o'clock 31 min., Jan. 1, 2000). At step 408, a time-determined segment initial value 407 can be directly represented by the character string of the time. If the segment initial value 407 is 8 o'clock, Jan. 1, 2000, ASCII code of "2000010108" can be used. At step 412, a times-determined dynamic variable (for instance, the times here is 37) can be represented by the integral value of the times (for instance, the integral value of 37). At step 408, the character string can also be used. If the segment initial value is 32, ASCII code of "32" can be used. In coding steps 408 and 412, the above values are filled up, accepted or rejected, or some simple operations(for instance, Boolean operations, arithmetic operations, modulo operations etc.) are performed so as to make their output results to meet the requirements on the input for algorithms 410 and 417. Also, the difference between them is enlarged. In the situation of supporting multiple verifiers, it is necessary to connect the verifier code 404 with segment initial value 407, forming the input for coding step 408. Besides, whether PIN 401 is used together with the verifier code 404 for the input coding step 408 can be set as an option in the system. If PIN 401 is also used for the input for coding step 408, the verifier side has to store the PIN of the user. This results in a two-factor verification solution. Namely, the verifier requires not only the secret cryptographic key 405 of the password generator, also the PIN of the user.

The algorithm 410 and algorithm 417 can be either public cipher algorithms or secret cipher algorithms. Algorithm 410 and algorithm 417 can be either identical or somewhat different. These two algorithms should be safe cipher algorithms in the sense of cryptology, such as cryptographic algorithm DES, one-way hash algorithm SHA, etc. They can also be safe pseudo-random number generator PRNG in the sense of cryptology, such as the method of generating pseudo-random number proposed by ANSI X9.17 standard, FIPS 186 standard, etc. No matter which algorithm or method is used, its aim is to make the output results of these algorithms have very good randomness and unpredictability. As to which algorithm or method is used, it is not the main content of the present invention. Therefore here the reversible cryptographic algorithm, the one-way hash algorithm, or other cipher algorithms and their combinations are generally called encryption process (such as the aforesaid encryption process-1, encryption process-2, encryption process-1a, encryption process-2a, etc.). For convenience of explaining with examples, here suppose algorithm 410 and algorithm 417 are all one-way hash algorithms SHA.

The secret cryptographic key 405, which is gotten out of the memory of the password generator, and the output results of coding step 408 are the input values for algorithm 410. After the application of SHA, the result of 160 bits is output. The first 80 bits are taken as the first dynamic cryptographic key 413. The second 80 bits are taken as the second dynamic cryptographic key 414. The second cryptographic key 414 and the output results of coding step 412 are taken as the input values of algorithm 417. After the application of SHA, the result of 160 bits is output. On the basis of m1+m2 bits for predetermined length of the dynamic password to be generated, in which first dynamic cipher 419 is m1 bits long and second dynamic cipher 420 is m2 bits long (For convenience of narration, binary system is taken as example in the following explanations. For decimal system, hexadecimal system, etc., the explanation is similar. It is unnecessary to go into details.), the first m2 bits of the output results of algorithm 417 (of course m2 bits of other positions can also be taken) are taken as second dynamic cipher 420. One simple method of the present invention is to take secret cryptographic key 405, or its part, for the cryptographic key of algorithm 417. After the cryptographic key and the output results of coding step 412 are input to algorithm 417 to generate the second dynamic cipher 420. Another better situation of the present invention is the second dynamic cryptographic key 414 and the offset 411 are first combined at step 415 to generate a new second dynamic cryptographic key 416. The new second dynamic cryptographic key 416, acting as a cryptographic key, and the output results of step 412 are then input to algorithm 417. Here the combination step 415 can be any logic or arithmetic operations such as modulo operations, list arrangement, table look-up operations etc.. It is safer to use a primary one-way hash function (for example, SHA). For instance, the second dynamic cryptographic key 414 and the offset 411 are input to SHA which outputs the new second dynamic cryptographic key 416 as a result. Therefore, there are a lot of choices for implementing the combination step 415, if only its output result has better randomness and unpredictability. Due to the combination step 415, the cryptographic keys used to generate the second dynamic cipher 420 each time are different. On the basis of the first dynamic cryptographic key 413, a dynamic transformation table 418 that can substitute all the offsets is generated. This transformation table permutes offset 411 to first dynamic cipher 419 of m1 bits.

One method of generating the dynamic transformation table 418 is: upon the action of the first dynamic cryptographic key 413, a dynamic permutation table of length r is generated (r equals the m1th power of 2,i.e. $r=2^{m1}$. For instance, if m1=8, r=256):

$$i \to S_i (0 \leq i < r, 0 \leq S_i < r)$$

Thus, when the offset 411 is k, the first dynamic cipher 419 is $S_k$. It is not difficult to generate a random, unpredictable permutation table with the first random, unpredictable cryptographic key 413. The efficiency is very high. The generation will involve the following steps.

First, the initial state of $S_i$ is set. The initial state of $S_i$ can be set as any plain, arbitrarily defined state. For instance, take $S_0=r-1, S_1=r-2, \ldots, S_{r-2}=1, S_{r-1}=0$. Or the initial state $S_i$ can also be set as a cryptographic key of the password generator. Namely, the initial state of $S_i$ of every password generator is different and secret.

Then, the first dynamic cryptographic key 413 is filled sequentially into $K_0, K_1, \ldots, K_{r-1}$ (each $K_1$ is m1 bits long). If the first dynamic cryptographic key 413 is not long enough, the cryptographic key can be used repeatedly, until all $K_0, K_1, \ldots, K_{r-1}$ have been filled. The following program will be executed:

j (==0;
FOR i FROM 0 TO r−1 DO
BEGIN
j (==(j+$S_i$+$K_i$) MOD r;
R (=$S_j$;
$S_j$ (==$S_i$;
$S_i$ (==R;
END

Thus, a dynamic permutation table determined by the first dynamic cryptographic key 413 is obtained:

$$i \to S_i (0 \leq i < r, 0 \leq S_i < r)$$

The value of m1 should not be less than the number of bits occupied by the maximum offset. Usually r takes a value which properly greater than the value of the maximum offset. Thus, due to the randomness and unpredictability of the permutation table, the randomness and unpredictability of the first dynamic cipher 419 can be increased. Here take the worst situation for analysis. Suppose L is the segment length and $r=2^{m1}$. When the offset is 0, the probability of conjecturing correctly the first dynamic cipher 419 is 1/r. When the offset is 1, supposing the result when the offset is 0 is known, the probability of conjecturing correctly the first dynamic cipher 419 is 1/(r−1), . . . , When the offset is L−1, supposing all the preceding results are known, the probability of conjecturing correctly the first dynamic cipher 419 is 1/(r−L+1). For an arbitrary offset, the average probability P of conjecturing correctly the first dynamic cipher 419 is P=(1/r+1/(r−1)+ . . . +1/(r−L+1))/L. The more r exceeds L, the smaller the average probability P is. Therefore, a proper selection of r which is somewhat greater than L can meet the actual requirement. Several situations are shown as follows:

| m1 | L | Average probability P |
|---|---|---|
| 8 | 60 | 0.4441% |
| 8 | 120 | 0.5257% |
| 8 | 180 | 0.6721% |
| 8 | 240 | 1.1432% |
| 9 | 240 | 0.2632% |

Consequently, when L=60, 120 or 180 and m1=8, the average probably P of conjecturing correctly the corresponding first dynamic cipher 419 is far smaller than $1/128$= 0.7812%. The later is the probability of conjecturing correctly a completely random, unpredictable code of 7 bits. Therefore, the probability of conjecturing correctly the first 8-bit dynamic cipher 419 substituted by the random permutation table of length 256 is far smaller than the probability $1/128$ of conjecturing correctly a completely random, unpredictable code of 7 bits. When L=240 and m1=8, the average probability P is also far smaller than $1/64$=1.5625%. The later is the probability of conjecturing correctly a completely random, unpredictable code of 6 bits. When L=240 and m1=9, the average probability P is far smaller than $1/256$= 0.3906%. The later is the probability of conjecturing correctly a completely random, unpredictable code of 8 bits.

Another method of generating the dynamic transformation table 418 is to generate L groups of random, unpredictable codes upon the application of the first dynamic cryptographic key 413. Each group has m1 bits. For convenience of narration, it might be called the method of generating random code-group. When the offset 411 is k, the k-th group of random, unpredictable code is taken as the first dynamic cipher 419. Specifically, the following steps will be performed:

First, a dynamic permutation table is generated according to the above method:

$$i \to S_i (0 \leq i < r, 0 \leq S_i < r).$$

Then, the following program is performed:

j (==0;
FOR i FROM 0 TO k DO
BEGIN
j==(j+$S_i$) MOD r;
R (==$S_j$;
$S_j$(==$S_i$;
$S_i$(==R;
END
t (==($S_i$+$S_j$) MOD r;
K (==$S_t$;

Here, k is the value of offset 411 in FIG. 4, and K is the resolved k-th group of random, unpredictable codes, which is taken as the first dynamic cipher 419. The probability of conjecturing correctly the first dynamic cipher 419 of m1 bits, which is generated according to this method, is all $1/2^{m1}$.

Thus, the aim of hidden transfer of synchronization information is reached. Using less bits of random, unpredictable codes both transmits implicitly synchronization information and makes each bit of the password safe and reliable.

Therefore, the various deficiencies of U.S. Pat. No. 5,887,065 in which synchronization information is transmitted in plain format are overcome.

Finally, the first dynamic cipher 419 and the second dynamic cipher 420 are combined together in step 421, forming the dynamic password to be generated. For example, the first dynamic cipher 419 and the second dynamic cipher 420 can be simply connected with each other to form the dynamic password in step 421. Alternatively, each bit of the first dynamic cipher 419 can be inserted in second dynamic cipher 420 at pre-determined positions to form the dynamic password. There are also some other ways of combination. The combination should be separable. Namely, based on the way of the combination, at the verifier side, the first dynamic cipher 419a and the second dynamic cipher 420a can be separated from the received dynamic password in step 421a in FIG. 5. Since both the first dynamic cipher 419 and the second dynamic cipher 420 are completely irrelevant, random, unpredictable ciphers, the probability of conjecturing correctly dynamic password obtained in step 421 is the product of the probability of conjecturing correctly the first dynamic cipher 419 and the probability of conjecturing correctly the second dynamic cipher 420. For the dynamic variable determined by the times of generating passwords, after the dynamic password is generated in step 421, the dynamic variable stored in the memory of the password generator needs to be increased by one automatically.

Figure 5:
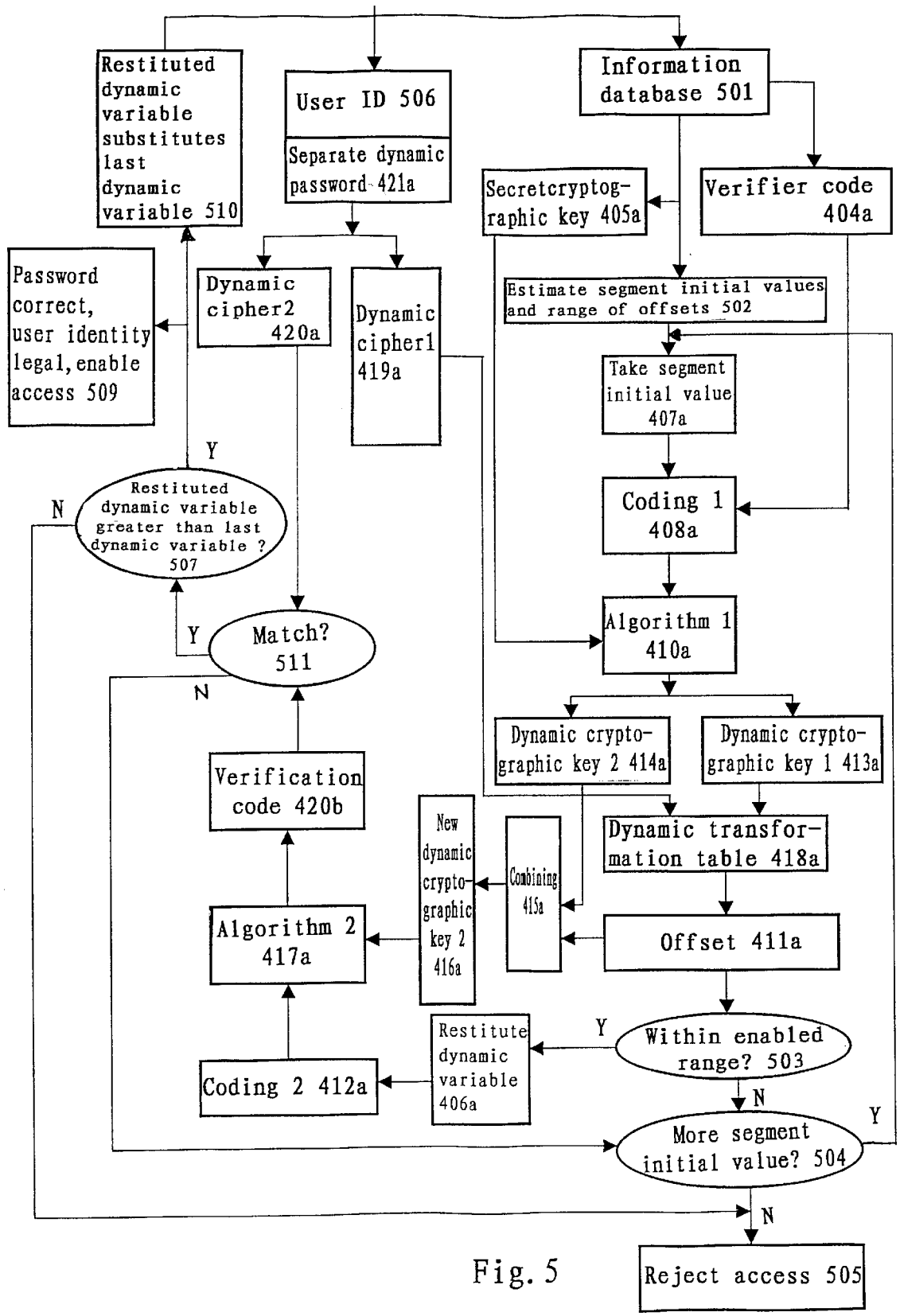
FIG. 5 is a diagram showing the principle of the operations of a verifier of the present invention when verifying a received dynamic password.

FIG. 5 is a diagram showing the operation of the verifier for verifying the dynamic password after the verifier receives user's request and password. The verifier has an information database 501, storing the information of the authorized users and the secret cryptographic keys of the password generators, as well as the relevant information used for synchronizing the dynamic variable in the password generator, which is recorded after each verification. After the verifier receives a user ID 506 (or the serial number of the password generator in place of the user ID. Hereafter, it is assumed user ID is used.) and a dynamic password, the dynamic password is separated into the first dynamic cipher 419a and the second dynamic cipher 420a in step 421a. If the dynamic password is based on time, it is also necessary to record the time of receiving the dynamic password, based on the clock of the verifier. Based on the user ID 506, the secret cryptographic key 405a of the password generator is extracted from information database 501. Then, on the basis of the information on the password generator recorded in information database 501, the scope of the segment initial value and the offset for the password generator to generate the dynamic password is estimated at step 502. The detailed method of estimation is described later. At step 407a, an estimated segment initial value is taken. If multiple verifiers are supported or PIN also takes effect, it is also necessary to retrieve the verifier code 404a or PIN from the information database 501 and encode them at step 408a. (coding step 408a should be consistent with coding step 408. Here the boxes having the same or similar functions compared with those in FIG. 4 are labeled with the same numerals attached by a. One example is 408a and 408. The functions of the verifier side corresponding to those at the generator side are also labeled with numerals attached by a. One example is encryption process-1 and encryption process-1a.) The secret cryptographic key 405a, which is extracted from database 501, and output results of step 408a are input into algorithm 410a (for instance, SHA). After the application of SHA, the result of 160 bits is output. The first 80 bits are taken as the first dynamic cryptographic key 413a. The second 80 bits are taken as the second dynamic cryptographic key 414a. On the basis of the first dynamic cryptographic key 413a, a dynamic transformation table 418a is generated.

The first method of generating the dynamic transformation table that corresponds with the aforementioned dynamic transformation table 418 is:

First, according to the aforesaid steps of generating a dynamic permutation table, under the action of the first dynamic cryptographic key 413a, a permutation table is generated $$i \to S_i (0 \leq i < r, 0 \leq S_i < r).$$

Then, an inverse permutation table is obtained by performing the following program:

FOR i FROM 0 TO r−1 DO

BEGIN

J (==$S_i$;

$Q_j$(==i;

END

Thus, the inverse permutation table: $i \to Q_i (0 \leq i < r, 0 \leq Q_i < r)$, which is the dynamic transformation table 418a, is obtained. The first dynamic cipher 419a (for instance, i) is permuted through the transformation table 418a to generate the required offset 411a (for instance, $Q_i$). At step 503, it is decided whether the recovered offset 411a is within the estimated range of offsets. If so, the process goes to step 406a, otherwise, to step 504.

In the second method of generating dynamic transformation table 418, the value of each offset within the range of offsets which is estimated in step 502 is taken as k. After the execution of the aforesaid method of generating random code-group, a corresponding result K is obtained. If K matches the first dynamic cipher 419a, k is regarded as the required offset 411a, and the process goes to step 406a. If there is no match within the estimated range of offsets, the process goes to step 504.

At step 504, it inquires whether there is another estimated segment initial value in step 502. At most only two segment initial values are possible. If there is another one, the process returns to step 407a to fetch the next segment initial value and repeats the above procedure. If there is no other segment initial value, the access is rejected at step 505, and it decided that the password is incorrect and the user is not an authorized user. Here, most of the illegal passwords will be excluded and it is unnecessary to perform further operations. Therefore, the problem of being unable to exclude illegal passwords effectively, as existent in U.S. Pat. No. 4,885,778, is better solved. The following table shows the probability of excluding illegal passwords under different conditions. Here, set the length of the first dynamic cipher 419 or 419a as 8 bits, namely m1=8:

| Number of offsets within the estimated range of offset | Average probability of excluding illegal passwords |
| --- | --- |
| 1 | 99.609% |
| 2 | 99.219% |
| 3 | 98.828% |
| 4 | 98.437% |
| 5 | 98.047% |
| 6 | 97.656% |
| 7 | 97.266% |
| 8 | 96.875% |
| 9 | 96.484% |
| 10 | 96.094% |

Therefore, if only L<256, it is more ideal to set the length of the first dynamic cipher 419 or 419a as 8 bits. This is because the low-price and prevalent single chip computer is the 8-digit computer, which can execute the above programs for generating dynamic permutation tables efficiently. Therefore the selection of the first dynamic cipher having 8 bits is a good compromise no matter in respect of safety requirement, running efficiency, or space, etc. Of course, in view of specific requirements, it is also possible to increase or decrease the number of bits in the first dynamic cipher 419 or 419a. For instance, the increase of one bit, under the same conditions, can further improve the average probability of excluding illegal passwords.

On the basis of the estimated segment initial value obtained in step 407a and offset 411a, the dynamic variable is restituted in step 406a. For instance, the sum of the segment initial value and offset 411a are used to restitute the dynamic variable in step 406a. The dynamic variable, after being coded at step 412a, and the second dynamic cryptographic key 414a are input to algorithm 417a (for instance, SHA). Another situation is: the second dynamic cryptographic key 414a is first combined with offset 411a at step 415a to generate a new dynamic cryptographic key 416a; and then dynamic cryptographic key 416a and the output results of step 412a are input to algorithm 417a (for instance, SHA). The first m2 bits of the output results of the algorithm 417a (of course m2 bits of other positions can also be taken) are taken as an verification code 420b. The verification code 420b is compared with the second dynamic cipher 420a at step 511. If there is no match, the process returns to step 504 to proceed the aforesaid operations. If there is a match, it is decided at step 507 whether the dynamic variable restituted in step 406a is greater than the dynamic variable used by the password generator in last successful access and recorded in the information database 501 (i.e. t in FIG. 6 or c in FIG. 7), which is abbreviated as last dynamic variable. If the dynamic variable restituted in step 406a is not greater than last dynamic variable, the access will be rejected at step 505. Thus the playback offence is completely avoided. If the dynamic variable restituted in step 406a is greater than last dynamic variable, the verifier regards the password as legal password, the user as an authorized user, and enables the user to access the system resource or provides the requested service at step 509. At the same time, the dynamic variable restituted in step 406a is used to substitute the last dynamic variable stored in the information database 501 at step 510. That is, the dynamic variable restituted in step 406a becomes a new last dynamic variable. Besides, if the dynamic variable is defined by time, the difference between the dynamic variable restituted in the step 406a and the dynamic variable (i.e. T in FIG. 6) determined by the time when the user ID 506 and dynamic password are received by the verifier and recorded at step 601 in FIG. 6 is recorded in the information database 501 as an deviation (note: diff), replacing the original deviation diff.

The flowcharts of password generation and password verification shown in FIG. 8 are alternate schemes of FIG. 4 and FIG. 5. There are three ways of inputting cryptographic key into algorithm 417. In the first way, secret cryptographic key 405 or a part of it is directly used as the input value of algorithm 417. In the second way, the result or partial result of the operation of the secret cryptographic key 405 and the segment initial value 407 is used as the input value of algorithm 417. For instance, the cryptographic key 414 can be taken as the input value of algorithm 417. In the third way, an operation is first performed on the secret cryptographic key 405 and the segment initial value 407, the result or partial result of which and offset 411 then undergo another operation, and finally the output result of the later operation is taken as the input value of algorithm 417. For instance, The new cryptographic key 416 obtained from step 415 can be taken as the input value of algorithm 417.

Here, the involved steps are briefly described as follows.

a) At the time of generating a password, the microprocessor of the password generator executes the following steps:

a1) Based on the predetermined segment length and positions, the dynamic variable 406 is segmented so as to define a segment initial value 407 and an offset 411 for the current dynamic variable 406.

a2) An encryption process-1 is performed on the secret cryptographic key 405, segment initial value 407 and offset 411 in step 801, so as to obtain the first dynamic cipher 419. For instance, this encryption process-1 can contain the 410, 413 and 418 in FIG. 4. an encryption process-2 is performed on secret cryptographic key 405 and dynamic variable 406, so as to obtain the second dynamic cipher 420 in step 802. For instance, this encryption process-2 can be the algorithm 417.

a3) First dynamic cipher 419 and second dynamic cipher 420 are combined to generate a dynamic password in step 421.

b) The dynamic password is transferred to the verifier.

c) At the time of verifying a password, the microprocessor of the verifier executes the following steps:

c1) Extracting first dynamic cipher 419a and second dynamic cipher 420a from the received dynamic password in step 421a. Based on the dynamic variable at the verifier side, segment initial values and the range of offsets are estimated in step 502.

c2) An encryption process-1a is performed on the received dynamic cipher 419a, the estimated segment initial value obtained in step 407a and the secret cryptographic key 405a, in step 801a, so as to obtain a offset 411a. For instance, this encryption process-1a can contain the 410a, 413a and 418a in FIG. 5.

c3) If the offset 411a is within the range of the estimated offsets allowed in step 503, a dynamic variable is restituted in step 406a based on the offset 411a and the estimated segment initial value. An encryption process-2a is performed on the secret cryptographic key 405a and the dynamic variable restituted in step 406a so as to obtain an verification code 420b in step 802a. For instance, this encryption process-2a can be the algorithm 417a. The verification code 420b is compared with the received dynamic cipher 420a at step 511. If there is a match, the user is legal, the access is enabled at step 509 and the verification is terminated. If there is no match or the offset 411a is not within the range of the estimated offsets, it is decided at step 504 whether there is another estimated segment initial value. If there is not, the user is illegal, the access is rejected at step 505, and the verification is terminated. If there is one, the next segment initial value is taken and the process goes to step c2).

In step a2), it is also possible for an encryption process-2 be performed on secret cryptographic key 405, dynamic variable 406 and segment initial value 407, so as to obtain the second dynamic cipher 420. For instance, this encryption process-2 can contain the algorithm 410, 414 and 417 in FIG. 4. Or, the encryption process is performed on secret cryptographic key 405, dynamic variable 406, segment initial value 407 and the offset 411, so as to obtain second dynamic cipher 420. For instance, this encryption process-2 can contain the 410, 414, step 415,416 and 417 in FIG. 4.

Correspondingly, in step c3), it is also possible for an encryption process-2a be performed on the secret cryptographic key 405a, the dynamic variable restituted in step 406a and the segment initial value gotten in step 407a, so as to obtain an verification code 420b. For instance, this encryption process-2a can contain the algorithm 410a, 414a and 417a in FIG. 5. Or, the encryption process-2a is performed on the secret cryptographic key 405a, the restituted dynamic variable, the estimated segment initial value and the offset 411a, so as to obtain an verification code 420b. For instance, this encryption process-2a can contain the 410a, 414a, step 415a, 416a and 417a in FIG. 5.

FIG. 6 shows how the verifier side, after receiving a user password, according to its own clock and relevant information stored in the information database 501, estimates the segment initial values and a corresponding range of offsets of the dynamic variable when the password is generated at the password generator side. That is, FIG. 6 shows step 502 in detail. Here, it should be explained beforehand that the requirements on the basic time unit, the segmentation and the definition of positions, etc. used by the verifier side should be consistent with that of the password generator side, as mentioned above. It is unnecessary to go into details. After the verifier receives the user ID and the password, the current time is first recorded at step 601. This time defines a dynamic variable T. The t in information database 501 is the dynamic variable restituted last for the password generator, namely for last successfully logging on with the password generated by the password generator. The t0 is the dynamic variable restituted first for the password generator, namely for first successfully logging on with the password generated by the password generator. The diff is the difference between the dynamic variable t restituted last for successfully logging on with the password generated by the password generator and the dynamic variable T determined by the time recorded last in step 601. For instance, the diff can be set as last t minus last T. Of course, the diff can also be set as last T minus last t, but has an opposite meaning. The diff reflects the difference between the clock of the password generator and the clock of the verifier. When diff<0, it shows that the clock of the verifier is diff (a number) time units ahead of the clock of the password generator. Conversely, it is diff (a number) time units behind. For convenience of calculation, here the time-determined dynamic variables T, t and t0 can be defined as the number of time units elapsed after a starting time. Here is an example. Suppose 0 o'clock, Jan. 1, 2000 is the starting reference time; t0 is determined by 8 o'clock sharp, Jan. 1, 2000; t is determined by 10 o'clock sharp, Jan. 1, 2000 and T is determined by 13 o'clock sharp, Jan. 1, 2000. As a result, they can be expressed as t0=480, t=600 and T=780 respectively. At step 605 in FIG. 6, the number of predetermined length of time period is calculated for instance d1 months, taking month as a length of the time period in the following explanations. The result of the above calculation can be taken for integer. That is, take 0 for less than one month, 1 for less than 2 months, etc. The number of months from last t to current T is calculated at step 604 (e.g., d2 months). The deviation σ that could be resulted in d2 months is estimated at step 606 based on the known diff. When d1 or d2 equals to zero, set σ equal to 0. Namely, it is unnecessary to consider this deviation. Otherwise, σ=(diff/d1)×d2. The range [c1, c2] of the error of the estimated value allowed in the system is determined at step 607 based on the magnitude of d2. Because the greater d2 is, the more unpredictable factors affecting the synchronization of the clocks exist. The errors in various estimated values (such as σ) will increase. The range [c1, c2] can be determined according to the actual needs and detailed conditions. For instance, the range can be defined as follows:

When d2=0, take c1=−2, c2=+1.
When d2=1, take c1=−3, c2=+2.
When d2=2, take c1=−3, c2=+3.

Obviously, the range [c1, c2] determines the number of offsets within the range of offsets to be estimated by the verifier side. Another method is introduced for simplifying calculations. The calculation of σ can be omitted (namely set σ=0) and the above-defined [c1, c2] can be properly expanded. At this time, the parameter t0 in the information database can be omitted. For instance:

When d2=0, take c1=−2, c2=+1;
When d2=1, take c1=−3, c2=+3;
When d2=2, take 21=−4, c2=+4;

According to the same segmentation standard in the password generator, the offset r and segment initial value R are extracted from the dynamic variable T determined by the recorded time in step 601. Then the range of offsets is estimated at step 608, based on the results of steps 606, 607 and 603. The small value is b1=r+diff +σ+c1. The large value is b2=r+diff+σ+c2. If b2<0 at step 609, the estimated segment initial value takes R1 which is immediately before R, and the range of offsets takes [b1+max, b2+max] at step 610, wherein max means the maximum offset(i.e. max=L−1). Otherwise, if b1<0 at step 611, the estimated segment initial value takes R1, the range of offsets takes [b1+max, max]; another estimated segment initial value takes R, and the range of offsets takes [0, b2] at step 612. Otherwise, if b1>max at step 613, the estimated segment initial value takes R2, which is immediately after R, and the range of offsets takes [b1−max, b2−max] at step 614. Otherwise, if b2>max at step 615, the estimated segment initial value takes R2, and the range of offsets takes [0, b2−max]; another estimated segment initial value takes R, the range of offsets takes [b1, max] at step 616. Otherwise, the estimated segment initial value takes R, and the range of offsets takes [b1, b2] at step 617. The above sequence of judgement is not the only one. For instance, it is capable to judge in the sequence of whether the diff is greater than 0. Therefore, the sequence and mode of judgement is not important. The main point is there will be 5 possible situations in the estimation of segment initial values and the range of offsets. Only under two situations is it necessary to estimate two segment initial values in steps 612 and 616.

FIG. 7 shows how the verifier side estimates the segment initial value and the range of offsets when the times of password generating is taken as a dynamic variable at the password generator, based on the information in the information database, after receiving a user password. That is, FIG. 7 shows step 502 in detail. The c in information database 501 is the dynamic variable restituted last for the password generator, i.e., namely for last successfully logging on with the password generated by the password generator. After the verifier receives user ID 506 and a password, a value c is retrieved from the database and incremented by one at step 701. Based on the same segmentation standard as that used in the password generator, the offset r 702 and segment initial value R 703 are extracted from dynamic variable c+1. The range of the offsets is estimated at step 704. The small value b1=r and the large value b2=r+d. Here value d is the predetermined number of times, in which the password generator is allowed to continuously generate passwords that are not successfully verified at the verifier side. A unified value of d can be defined in the whole system. It can also be specifically defined for different users and adjusted according to the situation of usage of each user. The function of d corresponds to the allowable range of error [c1, c2], which is used by dynamic variables based on time. However, the determined value d has to be smaller enough than the defined segment length L. If b2 is greater than max at step 707, the estimated segment initial value takes R, and the range of offsets takes [b1, max]; another estimated segment initial value takes R2, which is immediately after R, and the range of offsets takes [0, b2-max] at step 708. Otherwise, the estimated segment initial value takes R, and the range of offsets takes [b1, b2] at step 709. Similarly, here the sequence and mode of judgement is not critical. The main point is only two possible estimated situations for segment initial value and offset can happen, and only under one situation is it necessary to estimate two segment initial values in steps 708.

In the attached claims, some new terms are used for the convenience of description. The correspondence between the new terms and the original terms is shown in the following table.

| New terms | Original Terms |
|---|---|
| the first secret cryptographic key | secret cryptographic key 405 |
| the second secret cryptographic key | secret cryptographic key 405a |
| the first dynamic variable | dynamic variable 406 |
| the second dynamic variable | T defined at step 601 |
| the third dynamic variable | dynamic variable restituted at step 406a |
| the first segment initial value | segment initial value 407 |
| the second segment initial value | segment initial value R defined at step 602 |
| the first offset | offset 411 |
| the second offset | offset r defined at step 603 |
| the third offset | offset 411a |
| the first encryption process | encryption process-1 performed at step 801 |
| the second encryption process | encryption process-2 peformed at step 802 |
| the third encryption process | encryption process-1a performed at step 801a |
| the fourth encryption process | encryption process-2a performed at step 802a |
| the first dynamic cipher | dynamic cipher 419 |
| the second dynamic cipher | dynamic cipher 420 |
| the third dynamic cipher | dynamic cipher 419a |
| the fourth dynamic cipher | dynamic cipher 420a |
| the first encryption algorithm | algorithm 410 |
| the second encryption algorithm | algorithm 417 |
| the third encryption algorithm | algorithm 410a |
| the fourth encryption algorithm | algorithm 417a |
| the first dynamic cryptographic key | dynamic cryptographic key 413 |
| the second dynamic cryptographic key | dynamic cryptographic key 414 |
| the third dynamic cryptographic key | dynamic cryptographic key 413a |
| the fourth dynamic cryptographic key | dynamic cryptographic key 414a |
| the fifth dynamic cryptographic key | dynamic cryptographic key 416 |
| the sixth dynamic cryptographic key | dynamic cryptographic key 416a |
| the first dynamic transformation table | dynamic transformation table 418 |
| the second dynamic transformation table | dynamic transformation table 418a |
| the first coding | coding 408 |
| the second coding | coding 412 |
| the third coding | coding 408a |
| the fourth coding | coding 412a |

The present invention has been described above with different specific examples. Persons skilled in the art can make various modifications to the present invention, without departing the spirit and scope of the present invention. For instance, both time and times of generating passwords can also determine the change of dynamic passwords. Thus, the invention is just limited by the attached claims.

What is claimed is:

1. A method of authenticating an individual from at least one individual in an authentication system, including at least one dynamic password generator and at least one verifier, said dynamic password generator holding therein a first secret cryptographic key and a first dynamic variable, said verifier holding therein a second secret cryptographic key of said dynamic password generator and a second dynamic variable, said first and second dynamic variables being produced independently in said dynamic password generator and said verifier; said method comprising steps of:

(a) in the event of generating a dynamic password, performing following steps by a microprocessor in said dynamic password generator:

(a1) segmenting said first dynamic variable, based on a predefined segment length and positions, identifying a first segment initial value and a first offset for said first dynamic variable;

(a2) carrying out a first encryption process on said first secret cryptographic key, said first segment initial value and said first offset to produce a first dynamic cipher; carrying out a second encryption process on said first secret cryptographic key and said first dynamic variable to produce a second dynamic cipher;

(a3) combining said first dynamic cipher and said second dynamic cipher to produce a dynamic password;

(b) transmitting said dynamic password to said verifier;

(c) in the event of verifying a password, performing following steps by a microprocessor in said verifier:

(c1) separating a received dynamic password into a third dynamic cipher and a fourth dynamic cipher; based on a predefined segment length and positions, segmenting said second dynamic, variable to identify a second segment initial value and a second offset for said second dynamic variable; and calculating at least one estimated segment initial value and an estimated range of offsets based on said second segment initial value and said second offset;

(c2) carrying out a third encryption process on said third dynamic cipher, an estimated segment initial value and said second secret cryptographic key to produce a third offset;

(c3) if said third offset is within the estimated range of offsets, restituting a third dynamic variable with said third offset and said estimated segment initial value; carrying out a fourth encryption process on said second secret cryptographic key and said third dynamic variable to produce a verification code; comparing said verification code with said fourth dynamic cipher; if matching, enabling the user to access since the user is deemed legal and having the verification terminated; if mismatching, or said third offset is not within the estimated range of offsets, judging whether there is another estimated segment initial value; if there is no other estimated segment initial value, rejecting the user's access and having the verification terminated since the user is deemed illegal; and if there is another estimated segment initial value, fetching a next estimated segment initial value and going to step (c2).

2. The method of authenticating an individual according to claim 1, characterized in that in said step (a2), said second encryption process is carried out on said first secret cryptographic key, said first dynamic variable and said first segment initial value to produce said second dynamic cipher;

in said step (c3), said fourth encryption process is carried out on said second secret cryptographic key, said third dynamic variable and said estimated segment initial value to produce said verification code.

3. The method of authenticating an individual according to claim 1, characterized in that in said step (a2), said second encryption process is carried out on said first secret cryptographic key, said first dynamic variable, said first segment initial value and said first offset to produce said second dynamic cipher;

in said step (c3), said fourth encryption process is carried out on said second secret cryptographic key, said third dynamic variable, said estimated segment initial value and said third offset to produce said verification code.

4. The method of authenticating an individual according to claim 1, characterized in that in said step (a2), said first encryption process including a first encryption algorithm carried out on said first secret cryptographic key and said first segment initial value to produce a first dynamic cryptographic key, and a first dynamic transformation table generated with said first dynamic cryptographic key; wherein said first offset is translated into said first dynamic cipher by said first dynamic transformation table;

in said step (c2), said third encryption process including a third encryption algorithm carried out on said second secret cryptographic key and said estimated segment initial value to produce a third dynamic cryptographic key, and a second dynamic transformation table generated with said third dynamic cryptographic key; wherein said third dynamic cipher is translated into said third offset by said second dynamic transformation table.

5. The method of authenticating an individual according to claim 4, characterized in that in said step (a2) by which said first dynamic cipher is produced, said first dynamic cryptographic key is used to construct a first dynamic permutation table, and said first offset is replaced with said first dynamic cipher by this table;

in said step (c2) by which said third offset is produced, said third dynamic cryptographic key is used to construct a second dynamic permutation table, and said third dynamic cipher is replaced with said third offset by this table.

6. The method of authenticating an individual according to claim 4, characterized in that in said step (a2) by which first dynamic cipher is produced, said first dynamic cryptographic key is used to construct a first random code-group, and a random code in said first random code-group is addressed by said first offset as said first dynamic cipher;

in said step (c2) by which third offset is produced, said third dynamic cryptographic key is used to construct a second random code-group, and the address of a random code in said second random code-group that matches said third dynamic cipher is said third offset.

7. The method of authenticating an individual according to claim 2, characterized in that in said step (a2), said second encryption process including a first encryption algorithm carried out on said first secret cryptographic key and said first segment initial value to produce a second dynamic cryptographic key, and a second encryption algorithm carried out on said second dynamic cryptographic key and said first dynamic variable to produce said second dynamic cipher;

in said step (c3), said fourth encryption process including a third encryption algorithm carried out on said second secret cryptographic key and said estimated segment initial value to produce a fourth dynamic cryptographic key, and a fourth encryption algorithm carried out on said fourth dynamic cryptographic key and said third dynamic variable to produce said verification code.

8. The method of authenticating an individual according to claim 3, characterized in that in said step (a2), said second encryption process including a first encryption algorithm carried out on said first secret cryptographic key and said first segment initial value to produce a second dynamic cryptographic key, which is then combined with said first offset to produce a fifth dynamic cryptographic key, and a second encryption algorithm carried out on said fifth dynamic cryptographic key and said first dynamic variable to produce said second dynamic cipher;

in said step (c3), said fourth encryption process including a third encryption algorithm carried out on said second secret cryptographic key and said estimated segment initial value to produce a fourth dynamic cryptographic key, which is then combined with said third offset to produce a sixth dynamic cryptographic key, and a fourth encryption algorithm carried out on said sixth dynamic cryptographic key and said third dynamic variable to produce said verification code.

9. The method of authenticating an individual according to claim 1, characterized in that said dynamic password generator is initiated to generate a first verifier code, and that the verifier side has a second verifier code, and that on said dynamic password generator, said first encryption process is carried out on said first verifier code, said first secret cryptographic key, said first segment initial value and said first offset to produce said first dynamic cipher, and said second encryption process is carried out on said first secret cryptographic key, said first dynamic variable and said first verifier code to produce said second dynamic cipher, and that on said verifier, said third encryption process is carried out on said second verifier code, said second secret cryptographic key, said estimated segment initial value and said third dynamic cipher t6 produce said third offset, and said fourth encryption process is carried out on said second verifier code, said second secret cryptographic key, and said third dynamic variable to produce said verification code.

10. A method of authenticating an individual from at least one individual in an authentication system, including at least one dynamic password generator and at least one verifier, said dynamic password generator holding therein a first secret cryptographic key and a first dynamic variable, said verifier holding therein a second secret cryptographic key of said dynamic password generator and a second dynamic variable, said first and second dynamic variables being produced in concert but independently in said dynamic password generator and said verifier; said method comprising steps of:

(a) in the event of generating a dynamic password, performing following steps by a microprocessor in said dynamic password generator:

(a1) segmenting said first dynamic variable, based on a predefined segment length and positions, identifying a first segment initial value and a first offset for said first dynamic variable;

(a2) carrying out a first encryption algorithm on said first secret cryptographic key and said first segment initial value to output a first dynamic cryptographic key and a second dynamic cryptographic key; generating a first dynamic transformation table based on said first dynamic cryptographic key; translating said first offset into a first dynamic cipher by said first dynamic transformation table; combining said second dynamic cryptographic key and said first offset to generate a fifth dynamic cryptographic key; and carrying out a second encryption algorithm on said fifth dynamic cryptographic key and said first dynamic variable to produce a second dynamic cipher;

(a3) combining said first dynamic cipher and said second dynamic cipher to produce a dynamic password;

(b) transmitting said dynamic password to said verifier;

(c) in the event of verifying a password, performing following steps by a microprocessor in said verifier:

(c1) separating a received dynamic password into a third dynamic cipher and a fourth dynamic cipher; segmenting said second dynamic variable, based on a predefined segment length and positions, identifying a second segment initial value and a second offset for said second dynamic variable; and calculating at least one estimated segment initial value and an estimated range of offsets based on said second segment initial value and said second offset;

(c2) carrying out a third encryption algorithm on said second secret cryptographic key and an estimated segment initial value to output a third dynamic cryptographic key and a fourth dynamic cryptographic key; generating a second dynamic transformation table based on said third dynamic cryptographic key, and translating said third dynamic cipher into a third offset by said second dynamic transformation table;

(c3) if said third offset is within the estimated range of offsets, restituting a third dynamic variable with said third offset and said estimated segment initial value; combining said fourth dynamic cryptographic key and said third offset to generate a sixth dynamic cryptographic key; carrying out a fourth encryption algorithm on said sixth dynamic cryptographic key and said third dynamic variable to produce a verification code; comparing said verification code with said fourth dynamic cipher; if matching, enabling the user to access since the user is deemed legal and having the verification terminated; if mismatching, or said third offset is not within the estimated range of offsets, judging whether there is another estimated segment initial value; if there is no another estimated segment initial value, rejecting the user's access and having the verification terminated since the user is deemed illegal; and if there is another estimated segment initial value, fetching a next estimated segment initial value and going to step (c2).

11. The method of authenticating an individual according to claim 1, characterized in that in said step (a1) and (c1), the method adopted for predefining a segment length and positions of said first and second dynamic variable uses said segment length to define the number of dynamic variables in a segment and the maximum offset, and uses said positions to define the starting point of a segment and segment initial values.

12. The method of authenticating an individual according to claim 1, characterized in that said first and second dynamic variables are defined respectively by the clocks of said dynamic password generator and said verifier, or defined by the number of times of passwords generated by said dynamic password generator.

13. The method of authenticating an individual according to claim 12, characterized in that if said first and second dynamic variables are defined by time, selecting said segment length greater enough than the maximum possible difference between the clocks of said dynamic password generator and said verifier during the effective time period of said dynamic password generator;

if said first and second dynamic variables are defined by the number of times of passwords generated by said dynamic password generator, selecting said segment length greater enough than the number of times of unverified passwords continuously generated by said dynamic password generator, which does not exceed the number permitted by said authentication system.

14. The method of authenticating an individual according to claim 12, characterized in that if said first and second dynamic variables are defined by time, said first and second dynamic variables should be time values or their function values of a predefined time unit having a fundamental duration interval;

if said first and second dynamic variables are defined by the number of times of passwords generated by said dynamic password generator, said first and second dynamic variables should be the values or their function values of the number of times of passwords generated by said dynamic password generator.

15. The method of authenticating an individual according to claim 1, characterized in that before carrying out of said first encryption process or said first encryption algorithm on said first segment initial value, a first coding is given to said first segment initial value, and before carrying out of said second encryption process or said second encryption algorithm on said first dynamic variable, a second coding is given to said first dynamic variable, and the ways of said first coding and said second coding are different;

before carrying out of said third encryption process or said third encryption algorithm on said estimated segment initial value, a third coding is given to said estimated segment initial value, and before carrying out of said fourth encryption process or said fourth encryption algorithm on said third dynamic variable, a fourth coding is given to said third dynamic variable, and the ways of said third coding and said fourth coding are different.

16. The method of authenticating an individual according to claim 4, characterized in that said first and second dynamic transformation tables generated by said first and third dynamic cryptographic keys is greater than said segment length.

17. The method of authenticating an individual according to 1, characterized in that if said segment length is no greater than 240, taking the length of said first and third dynamic ciphers as 8 bits.

18. The method of authenticating an individual according to claim 11, characterized in that the selection of said segment length should enable said starting point of a segment defined daily to remain consistent, and the selection of said starting point of a segment should keep away from the position of comparatively frequent user utilization period of said dynamic password generator.

19. The method of authenticating an individual according to claim 11, characterized in that
according to predefined said segment length and said positions, said first dynamic variable is equal to the product of said first segment initial value and a specific value, plus said first offset; and said second dynamic variable is equal to the product of said second segment initial value and a specific value, plus said second offset.

20. The method of authenticating an individual according to claim 1, characterized in that
in said step (c3), if a match between said verification code and said fourth dynamic cipher is found, comparing said third dynamic variable with the third dynamic variable of last successful access, if the former quantity is found to be greater than the latter quantity, the user is judged as legal, access is thus enabled, and using said third dynamic variable to substitute the third dynamic variable of last successful access, storing in a database, and then verification procedure is terminated; in cases where the former quantity is not greater than the latter quantity, the user is judged as illegal and access is rejected, and then verification procedure is terminated.

21. The method of authenticating an individual according to claim 1, characterized in that
the method of estimating segment initial values and the range of offsets is based on said second segment initial value and said second offset, selecting said second segment initial value and adjacent segment initial values in front of or behind said second segment initial value as said estimated segment initial values, selecting said second offset and adjacent offsets in front of and behind said second offset as said range of offsets;
and the number of selected estimated segment initial values can not be greater than two, and the number of offsets within said range of offsets can be greater than one.

22. The method of authenticating an individual according to claim 1, characterized in that
if said first and second dynamic variables are defined by time, the method of estimating segment initial values and the range of offsets is based on said second segment initial value R and said second offset r, defining an enabled error range [c1, c2] by the difference between last third dynamic variable and said second dynamic variable, defining an deviation value diff by the difference between last third dynamic variable and last second dynamic variable, defining a small value $b1=r+diff+c1$, and a large value $b2=r+diff+c2$; marking said maximum offset as max;
when b2<0, said estimated segment initial value is the values R1 adjacent and in front of R, and said estimated range of offsets is [b1+max, b2+max];
when b1<0<b2, one of said estimated segment initial values is the value R1 adjacent and in front of R, and said estimated range of offsets is [b1+max, max]; another estimated segment initial value is the value R, and said estimated range of offsets is [0, b2];
when b1>max, said estimated segment initial value is the value R2 adjacent and behind R, and said estimated range of offsets is [b1−max, b2−max];
when b1<max<b2, one of said estimated segment initial values is the value R2 adjacent and behind R, and said estimated range of offsets is [0, b2−max]; another estimated segment initial value is the value R, and said estimated range of offsets is [b1, max];
when neither of b1 or b2 are smaller than 0 and both are not greater than max, said estimated segment initial value is the value R, and said estimated range of offsets is [b1, b2];
if said first and second dynamic variables are defined by the number of times of passwords generated by the password generator, the method of estimating segment initial values and the range of offsets is based on accordance with said second segment initial value R and said second offset r, defining the number of times d by said authentication system, defining a small value $b1=r$, and a large value $b2=r+d$; marking said maximum offset as max;
when b2>max, one of said estimated segment initial value is the value R2 adjacent and behind R, and said estimated range of offsets is [0, b2−max]; another estimated segment initial value is the value R, and said estimated range of offsets is [b1, max];
when b2 is not greater than max, said estimated segment initial value is the value R and said estimated range of offsets is [b1, b2].

23. The method of authenticating an individual according to claim 1, characterized in that
if said first and second dynamic variables are defined by time, the method of estimating segment initial values and the range of offsets is based on accordance with said second segment initial value R and said second offset r, defining an enabled error range [c1, c2] by the difference between last third dynamic variable and said second dynamic variable, defining a deviation value diff by the difference between last third dynamic variable and last second dynamic variable, computing an average deviation diff/d1 in accordance with the number of time intervals d1 counted from first successful verification to last successful verification, estimating a deviation $\sigma=(diff/d1)\times d2$ in accordance with the number of time intervals d2 counted from last successful verification to present verification, and defining a small value $b1=r+diff+a+c1$ and a large value $b2=r+diff+\sigma+c2$; marking said maximum offset as max;
when b2<0, said estimated segment initial value is the values R1 adjacent and in front of R, and said estimated range of offsets is [b1+max, b2+max];
when b1<0<b2, one of said estimated segment initial values is the value R1 adjacent and in front of R, and said estimated range of offsets is [b1+max, max]; another estimated segment initial value is the value R, and said estimated range of offsets is [0, b2];
when b1>max, said estimated segment initial value is the value R2 adjacent and behind R, and said estimated range of offsets is [b1−max, b2−max];
when b1<max<b2, one of said estimated segment initial values is the value R2 adjacent and behind R, and said estimated range of offsets is [0, b2−max]; another estimated segment initial value is the value R, and said estimated range of offsets is [b1, max];
when neither of b1 or b2 are smaller than 0 and both are not greater than max, said estimated segment initial value is the value R, and said estimated range of offsets is [b1, b2].

24. A system of authenticating an individual from at least one individual in a computer network which includes at least one dynamic password generator and at least one verifier, said dynamic password generator holding therein a first secret cryptographic key and a first dynamic variable, said verifier holding therein a second secret cryptographic key of said dynamic password generator and a second dynamic variable, said first and second dynamic variables being produced independently in said dynamic password generator and said verifier; characterized in that said dynamic password generator comprises:

means for segmenting said first dynamic variable, based on a predefined segment length and positions, and identifying a first segment initial value and a first offset for said first dynamic variable;

means for carrying out a first encryption process on said first secret cryptographic key, said first segment initial value and said first offset to produce a first dynamic cipher;

means for carrying out a second encryption process on said first secret cryptographic key and said first dynamic variable to produce a second dynamic cipher;

means for combining said first dynamic cipher and said second dynamic cipher to produce a dynamic password;

and that said verifier comprises:

means for separating a received dynamic password into a third dynamic cipher and a fourth dynamic cipher;

means for segmenting said second dynamic variable to identify a second segment initial value and a second offset for said second dynamic variable based on a predefined segment length and positions;

means for calculating at least one estimated segment initial value and an estimated range of offsets based on said second segment initial value and said second offset;

means for carrying out a third encryption process on said third dynamic cipher, an estimated segment initial value and said second secret cryptographic key to produce a third offset;

means for restituting a third dynamic variable with said third offset and said estimated segment initial value if said third offset is within the estimated range of offsets;

means for carrying out a fourth encryption process on said second secret cryptographic key and said third dynamic variable to produce a verification code;

means for comparing said verification code with said fourth dynamic cipher;

means for enabling the user to access if matching;

means for judging whether there is another estimated segment initial value, if mismatching, or said third offset is not within the estimated range of offsets;

means for rejecting the user's access and having the verification terminated if there is no other estimated segment initial value;

means for fetching a next estimated segment initial value and giving control to said means for restituting a third dynamic variable if there is another estimated segment initial value.

* * * * *